United States Patent
Miura et al.

(10) Patent No.: US 10,400,697 B2
(45) Date of Patent: Sep. 3, 2019

(54) CONTROL APPARATUS OF ENGINE

(71) Applicant: Mazda Motor Corporation, Aki-gun, Hiroshima (JP)

(72) Inventors: Shin Miura, Aki-gun (JP); Kazuhiro Nishimura, Higashihiroshima (JP); Tomoaki Fujiyama, Iwakuni (JP); Takuo Hirano, Higashihiroshima (JP); Akira Suzuki, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 196 days.

(21) Appl. No.: 15/267,033

(22) Filed: Sep. 15, 2016

(65) Prior Publication Data

US 2017/0089284 A1 Mar. 30, 2017

(30) Foreign Application Priority Data

Sep. 30, 2015 (JP) .................................. 2015-192789

(51) Int. Cl.
*F02D 41/14* (2006.01)
*F01N 3/20* (2006.01)
(Continued)

(52) U.S. Cl.
CPC ........... *F02D 41/1447* (2013.01); *F01N 3/20* (2013.01); *F02B 37/18* (2013.01);
(Continued)

(58) Field of Classification Search
CPC .. F02D 41/1447; F02D 41/0007; F02D 41/26; F02D 2041/001; F02D 41/025;
(Continued)

(56) References Cited

U.S. PATENT DOCUMENTS 4,813,232 A * 3/1989 Hitomi .................... F01N 13/08
60/280
5,216,883 A * 6/1993 Flugger .................. F01N 13/08
60/313
(Continued)

FOREIGN PATENT DOCUMENTS

JP 2004257355 A * 9/2004 ............. F02D 45/00
JP 2007177646 A * 7/2007
JP 2007533885 A 11/2007

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

A control apparatus of an engine including an intake valve, an exhaust valve, and a variable valve timing mechanism for varying open and close timings of at least one of the intake and exhaust valves, is provided. The control apparatus includes a processor configured to execute a valve controlling module for performing, via the variable valve timing mechanism, a valve overlap in which the intake and exhaust valves are both opened on intake stroke of the engine, and a temperature estimating module for estimating a temperature of exhaust gas at a given location in the exhaust system by estimating a temperature increase of the exhaust gas caused by afterburn and accounting for the temperature increase, the afterburn occurring due to fresh air blowing through a cylinder of the engine to an exhaust system during the valve overlap.

11 Claims, 19 Drawing Sheets

(51) Int. Cl.
*F02B 37/18* (2006.01)
*F02D 41/26* (2006.01)
*F02D 41/00* (2006.01)
*F02D 13/02* (2006.01)
*F02D 41/02* (2006.01)

(52) U.S. Cl.
CPC ......... *F02D 41/0007* (2013.01); *F02D 41/26* (2013.01); *F02D 13/0215* (2013.01); *F02D 13/0261* (2013.01); *F02D 41/025* (2013.01); *F02D 2041/001* (2013.01); *Y02T 10/144* (2013.01)

(58) Field of Classification Search
CPC .... F02D 13/0261; F02D 13/0215; F01N 3/20; F02B 37/18; Y02T 10/144
USPC ......................................................... 701/102
See application file for complete search history.

(56) References Cited

U.S. PATENT DOCUMENTS

| | | | | | |
|---|---|---|---|---|---|
| 5,414,994 | A * | 5/1995 | Cullen | ................ | F02D 41/1441 60/274 |
| 5,544,639 | A * | 8/1996 | Shouda | ................... | F01N 9/005 123/676 |
| 5,590,521 | A * | 1/1997 | Schnaibel | ............... | F01N 9/005 374/E7.042 |
| 5,722,236 | A * | 3/1998 | Cullen | ................. | F01N 3/0814 60/274 |
| 6,067,498 | A * | 5/2000 | Akiyama | ............. | F02D 41/222 701/101 |
| 6,092,016 | A * | 7/2000 | Sarangapani | ........... | F02B 75/22 123/676 |
| 8,315,776 | B2 * | 11/2012 | Karnik | ..................... | F01N 3/10 123/676 |
| 2004/0122584 | A1 * | 6/2004 | Muto | ................. | F02D 41/0072 701/108 |
| 2005/0228572 | A1 * | 10/2005 | Mansbart | ................ | F01N 9/005 701/108 |
| 2006/0276955 | A1 * | 12/2006 | Kein | ..................... | F01N 11/005 701/114 |
| 2009/0216427 | A1 * | 8/2009 | Yamakawa | ......... | F02D 13/0215 701/103 |
| 2010/0217504 | A1 * | 8/2010 | Fujii | ....................... | F01L 1/344 701/105 |
| 2010/0312451 | A1 * | 12/2010 | Karnik | ..................... | F01N 3/10 701/102 |
| 2011/0041476 | A1 * | 2/2011 | Zanetti | .................... | F01N 3/103 60/273 |
| 2011/0154821 | A1 * | 6/2011 | Evans-Beauchamp | ..................... | F02B 39/16 60/615 |
| 2011/0209685 | A1 * | 9/2011 | Shane | ................. | F02D 41/0002 123/299 |
| 2011/0253116 | A1 * | 10/2011 | Eiraku | .................... | F02D 23/02 123/676 |
| 2012/0011831 | A1 * | 1/2012 | Neisen | ................ | F02D 41/0235 60/285 |
| 2012/0159933 | A1 * | 6/2012 | Karnik | ..................... | F01N 3/10 60/274 |
| 2013/0074478 | A1 * | 3/2013 | Yamaguchi | ............. | F01N 13/10 60/276 |
| 2013/0080083 | A1 * | 3/2013 | Chi | ........................ | F01N 9/005 702/50 |
| 2013/0085658 | A1 * | 4/2013 | Miyake | ............... | F02D 41/2441 701/112 |
| 2013/0174547 | A1 * | 7/2013 | Petrovic | ................. | F02B 47/08 60/605.2 |
| 2013/0312708 | A1 * | 11/2013 | Kuriyama | ............... | F02D 41/00 123/478 |
| 2014/0000554 | A1 * | 1/2014 | Tsuyuki | ................ | F02D 41/0007 123/295 |
| 2014/0238339 | A1 * | 8/2014 | Sato | ........................ | F02D 17/04 123/295 |
| 2015/0052890 | A1 * | 2/2015 | Shinoda | ................ | F02D 41/025 60/603 |
| 2015/0068191 | A1 * | 3/2015 | Panciroli | ............. | F02D 41/0087 60/273 |
| 2015/0114340 | A1 * | 4/2015 | Saito | ....................... | F02D 37/00 123/294 |
| 2015/0308364 | A1 * | 10/2015 | Hojo | ..................... | F02D 41/1439 60/285 |
| 2015/0330326 | A1 * | 11/2015 | Shaver | ................ | F02D 41/0062 123/445 |

* cited by examiner

CONTROL APPARATUS OF ENGINE

BACKGROUND

An art disclosed here relates to a control apparatus of an engine.

Conventionally, various controls are performed on engines by using an exhaust gas temperature, and for this, the exhaust gas temperature is estimated.

For example, JP2007-533885A discloses a control apparatus of an engine, which estimates a temperature of exhaust gas flowing into a catalyst converter. Specifically, the control apparatus obtains an exhaust gas temperature on a downstream side of a turbine of a turbocharger (i.e., the exhaust gas temperature flowing into the catalyst converter) by determining an exhaust gas temperature on an upstream side of the turbine, obtaining a correction term determined based on an air flow rate and an engine speed, and subtracting the corrected term from the exhaust gas temperature on the upstream side of the turbine.

However, the exhaust gas temperature is influenced by various factors, and with the method of JP2007-533885A, the estimation accuracy of the exhaust gas temperature is not high. For example, in a case of performing a valve overlap in which open timings of intake and exhaust valves are overlapped, fresh air blow-through in which fresh air flows through a cylinder to an exhaust system occurs. The fresh air blow-through is one of the factors which greatly influences the exhaust gas temperature. With the method of JP2007-533885A, the estimation accuracy of the exhaust gas temperature when the fresh air blow-through occurs is not high.

SUMMARY

The present invention is made in view of the above issues, and aims to improve estimation accuracy of an exhaust gas temperature.

According to one aspect of the present invention, a control apparatus of an engine including an intake valve, an exhaust valve, and a variable valve timing mechanism for varying open and close timings of at least one of the intake and exhaust valves is provided. The apparatus includes a processor configured to execute a valve controlling module for performing, via the variable valve timing mechanism, a valve overlap in which the intake and exhaust valves are both opened on intake stroke of the engine, and a temperature estimating module for estimating a temperature of exhaust gas at a given location in the exhaust system by estimating a temperature increase of the exhaust gas caused by afterburn and accounting for the temperature increase, the afterburn occurring due to fresh air blowing through a cylinder of the engine to an exhaust system during the valve overlap.

With the above configuration, the valve overlap is performed on the intake stroke, and the fresh air blows from an intake system to the exhaust system. If unburned fuel exists in the exhaust system, the fresh air reacts with the unburned fuel and a so-called afterburn occurs. Thus, the temperature estimating module estimates the temperature increase caused by the afterburn, and estimates the exhaust gas temperature at the given location in the exhaust system by accounting for the temperature increase amount of the exhaust gas caused by the afterburn. As a result, the temperature estimating module can accurately estimate the exhaust gas temperature.

Further, the temperature estimating module may estimate a discharging temperature based on an operating state of the engine, and estimate the exhaust gas temperature at the given location in the exhaust system based on the discharging temperature, the discharging temperature being a temperature of the exhaust gas when discharged from the cylinder to the exhaust system.

With the above configuration, the temperature estimating module estimates the exhaust gas temperature at the given location in the exhaust system by accounting for the temperature increase of the exhaust gas caused by the afterburn, on the basis of the discharging temperature estimated based on the operating state of the engine. Depending on the operating state of the engine, there may be a case where a fuel amount is increased to lower the exhaust gas temperature with a latent heat of vaporization of the fuel. Since the temperature estimating module estimates the discharging temperature based on the operating state of the engine, in such a case of increasing the fuel amount, the discharging temperature in consideration of the increased fuel amount can be estimated. Thus, the temperature estimating module can accurately estimate the exhaust gas temperature by accounting for the temperature decrease amount caused by the fuel amount increase and the temperature increase amount of the exhaust gas caused by the afterburn.

Further, the temperature estimating module may estimate a temperature decrease of the exhaust gas caused by an exhaust port being cooled due to the fresh air blowing through to the exhaust system during the valve overlap, and estimate the exhaust gas temperature at the given location in the exhaust system by further accounting for the temperature decrease caused by the cooling of the exhaust port.

With the above configuration, the temperature decrease of the exhaust gas caused by the fresh air blow-through is also considered. In other words, the fresh air blow-through does not only increase the exhaust gas temperature by the afterburn, but also decreases the exhaust gas temperature by the cooling of the exhaust port. Therefore, the temperature estimating module estimates the temperature decrease of the exhaust gas caused by the exhaust port being cooled due to the fresh air blow-through, and estimates the exhaust gas temperature at the given location in the exhaust system by further accounting for the temperature decrease amount. Thus, the temperature estimating module can further accurately estimate the exhaust gas temperature.

Further, the exhaust system may include a catalyst for purifying the exhaust gas. The temperature estimating module may estimate, as the temperature increase of the exhaust gas caused by the afterburn, a temperature increase caused by afterburn that occurs in the exhaust system upstream of the catalyst, and a temperature increase caused by afterburn that occurs at the catalyst.

With the above configuration, in estimating the exhaust gas temperature, both the afterburn that occurs in the exhaust system upstream of the catalyst and the afterburn that occurs at the catalyst are taken into consideration. Here, the catalyst easily becomes high in temperature due to the reaction therein, and accordingly the fresh air easily reacts with the unburned fuel at the catalyst. The fresh air may react with the unburned fuel also in another part of the exhaust system which becomes high in temperature (this other part differs depending on the configuration of exhaust system). The temperature estimating module takes into consideration the temperature increase caused by the afterburn that occurs in the exhaust system upstream of the catalyst, as well as the temperature increase caused by the afterburn that occurs at the catalyst. Thus, the exhaust gas temperature can further accurately be estimated.

Further, an upstream part of the exhaust system may be structured by branched pipes communicating with a plurality of cylinders of the engine, and the branched pipes may be collected together in a manifold section. The temperature estimating module may estimate, as the temperature increase caused by the afterburn that occurs in the exhaust system upstream of the catalyst, a temperature increase caused by afterburn that occurs at the manifold section.

With the above configuration, since the branched pipes communicating with the plurality of cylinders are collected together in the manifold section, the exhaust gas discharged from the cylinders merges in the manifold section and the temperature thereof easily becomes high. In other words, the afterburn easily occurs at the manifold section. For this reason, the temperature estimating module estimates the temperature increase caused by the afterburn that occurs at the manifold section and estimates the exhaust gas temperature at the given location in the exhaust system by accounting for the temperature increase amount. In this manner, the temperature estimating module can further accurately estimate the exhaust gas temperature by accounting for the plurality of afterburns that are highly possible to occur in the exhaust system.

Further, the temperature estimating module may estimate a temperature increase of the exhaust gas caused by the exhaust gas merging in the manifold section after being discharged from the plurality of cylinders, and estimate the exhaust gas temperature at the given location in the exhaust system by further accounting for the temperature increase caused by merging of the exhaust gas in the manifold section.

As described above, the manifold section is not only where the afterburn easily occurs, but may also be where the temperature of the exhaust gas increases due to the merging of the exhaust gas discharged from the plurality of cylinders. For this reason, the temperature estimating module estimates the temperature increase of the exhaust gas caused by the exhaust gas merging in the manifold section, and estimates the exhaust gas temperature at the given location in the exhaust system by accounting for the temperature increase amount. Thus, the exhaust gas temperature can more accurately be estimated.

The temperature estimating module may estimate a temperature increase of the exhaust gas caused by a reaction heat at the catalyst, and estimate the exhaust gas temperature at the given location in the exhaust system by further accounting for the temperature increase caused by the reaction heat of the catalyst.

As described above, the catalyst is not only where the afterburn occurs, but may also be increased in temperature by the reaction heat therein. For this reason, the temperature estimating module estimates the temperature increase of the exhaust gas caused by the reaction heat at the catalyst, and estimates the exhaust gas temperature at the given location in the exhaust system by accounting for the temperature increase amount. Thus, the exhaust gas temperature can more accurately be estimated.

The temperature estimating module may estimate a temperature decrease of the exhaust gas caused by the exhaust system being cooled with a traveling wind, and estimate the exhaust gas temperature at the given location in the exhaust system by further accounting for the temperature decrease caused by the cooling with the traveling wind.

With the above configuration, the temperature estimating module estimates the exhaust gas temperature at the given location in the exhaust system by accounting for the temperature decrease of the exhaust gas caused by the cooling with the traveling wind. Here, the exhaust system is cooled with the traveling wind. In this manner, the cooling of the exhaust system with the traveling wind may also influence the exhaust gas temperature. For this reason, the temperature estimating module estimates the exhaust gas temperature at the given location in the exhaust system by accounting for the temperature decrease of the exhaust gas caused by the cooling with the traveling wind. Thus, the exhaust gas temperature can more accurately be estimated.

The exhaust system may include a turbine of a turbocharger. The temperature estimating module may estimate a temperature decrease of the exhaust gas caused by work of the turbine, and estimate the exhaust gas temperature at the given location in the exhaust system by further accounting for the temperature decrease caused by the work of the turbine.

With the above configuration, the temperature estimating module estimates the exhaust gas temperature at the given location in the exhaust system by accounting for the temperature decrease of the exhaust gas caused by the work of the turbine. Here, if the turbine of the turbocharger is provided to the exhaust system, heat of the exhaust gas is lost by being converted into the work of the turbine. In this manner, the work of the turbine may also influence the exhaust gas temperature. For this reason, the temperature estimating module estimates the exhaust gas temperature at the given location in the exhaust system by accounting for the temperature decrease of the exhaust gas caused by the work of the turbine. Thus, the exhaust gas temperature can more accurately be estimated.

According to another aspect of the present invention, a control apparatus of an engine including an intake valve, an exhaust valve, and a variable valve timing mechanism for varying open and close timings of at least one of the intake and exhaust valves is provided. The apparatus includes a processor configured to execute a valve controlling module for performing, via the variable valve timing mechanism, a valve overlap in which the intake and exhaust valves are both opened on intake stroke of the engine, and a temperature estimating module for estimating a temperature of exhaust gas at a given location in the exhaust system by accounting for a temperature increase of the exhaust gas caused by afterburn, and controlling the engine based on the estimated exhaust gas temperature, the temperature estimating module estimating the temperature increase caused by the afterburn, the afterburn occurring due to fresh air blowing through a cylinder of the engine to an exhaust system during the valve overlap.

DETAILED DESCRIPTION OF EMBODIMENTS

Hereinafter, illustrative embodiments are described with reference to the appended drawings.

<Engine Configuration>

Figure 1:
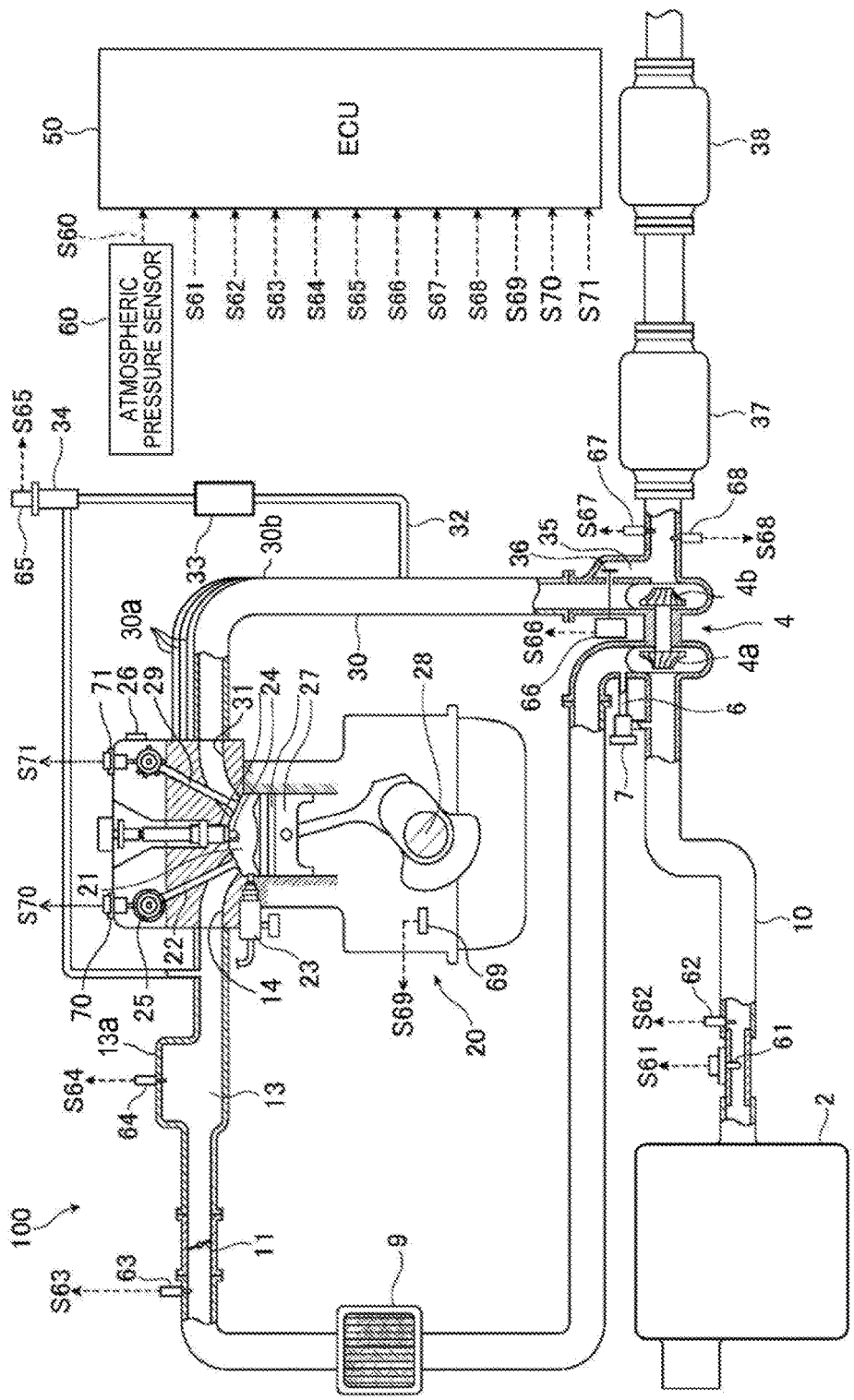
FIG. 1 is a schematic configuration view of an engine.

FIG. 1 is a schematic configuration view of an engine to which a control apparatus according to this embodiment is applied.

As illustrated in FIG. 1, the engine 100 (e.g., gasoline engine) is mounted on a vehicle and mainly has an intake passage (intake system) 10 through which intake air (air) externally introduced passes, an engine body 20 to which the intake passage 10 is coupled, an exhaust passage (exhaust system) 30 coupled to the engine body 20, and an Electronic Control Unit (ECU) 50 for controlling the entire engine 100.

In the intake passage 10, an air cleaner 2 for purifying the externally introduced intake air, a compressor 4a provided to a turbocharger 4 and for pressurizing the intake air passing therethrough, an intercooler 9 for cooling the intake air passing therethrough, a throttle valve 11 for adjusting a flow rate of the intake air passing therethrough, and an intake manifold 13 having a surge tank 13a for temporarily storing the intake air supplied to the engine body 20 are arranged in this order from an upstream side. The intake manifold 13 is connected with intake ports 14 of the engine body 20.

Further in the intake passage 10, an air bypass passage 6 for recirculating a part of the intake air turbocharged by the compressor 4a, back to an upstream side of the compressor 4a is provided. One end of the air bypass passage 6 is connected with the intake passage 10 at a position downstream of the compressor 4a and upstream of the throttle valve 11, and the other end of the air bypass passage 6 is connected with the intake passage 10 at a position upstream of the compressor 4a. Moreover, an air bypass valve 7 for controlling a flow rate of the intake air passing through the air bypass passage 6 is provided to the air bypass passage 6.

The engine body 20 mainly has intake valves 22 for opening and closing the intake ports 14, respectively, fuel injectors 23 for injecting the fuel into cylinders 21, respectively, ignition plugs 24 for igniting mixture gas containing the intake air and the fuel supplied into the cylinders 21, respectively, pistons 27 for being reciprocated by combustion of the mixture gas inside the cylinders 21, respectively, a crankshaft 28 for rotating in relation to the reciprocations of the pistons 27, and exhaust valves 29 for opening and closing exhaust ports 31.

An intake camshaft and an exhaust camshaft (not illustrated) are coupled to the crankshaft 28 to be driven thereby. The intake camshaft rotates in conjunction with the crankshaft 28 to drive the intake valves 22. Thus, each intake valve 22 reciprocates to open and close the intake port 14 at given timings. Similarly, the exhaust camshaft rotates in conjunction with the crankshaft 28 to drive the exhaust valves 29. Thus, each exhaust valve 29 reciprocates to open and close the exhaust port 31 at given timings.

The engine body 20 includes a variable valve timing mechanism (intake VVT) 25 for advancing or retarding a phase of the intake camshaft, and a variable valve timing mechanism (exhaust VVT) 26 for advancing or retarding a phase of the exhaust camshaft.

The intake VVT 25 varies each of the open and close timings of the intake valve 22 between a most-advanced timing and a most-retarded timing by advancing or retarding the phase of the intake camshaft. In this embodiment, the intake VVT 25 includes an electromagnetic valve. Similarly, the exhaust VVT 26 varies each of the open and close timings of the exhaust valve 29 by advancing or retarding the phase of the exhaust camshaft. In this embodiment, the exhaust VVT 26 includes a hydraulic solenoid valve.

In the exhaust passage 30, a turbine 4b provided to the turbocharger 4 and for rotating by letting exhaust gas pass therethrough so as to rotate the compressor 4a, and exhaust emission control catalysts 37 and 38 having an exhaust gas purifying function are arranged in this order from an upstream side. The exhaust emission control catalysts 37 and 38 are, for example, an NOx catalyst, a three-way catalyst, and/or an oxidation catalyst.

An upstream end part of an exhaust pipe forming the exhaust passage 30 has branched pipes 30a coupled to the respective exhaust ports 31, and a manifold section 30b where the branched pipes 30a are collected together. One or some of the branched pipes 30a are formed by an exhaust manifold.

Further, the exhaust passage 30 is connected with an Exhaust Gas Recirculation (EGR) passage 32 for recirculating the exhaust gas back to the intake passage 10. One end of the EGR passage 32 is connected with the exhaust passage 30 at a position upstream of the turbine 4b, and the other end of the EGR passage 32 is connected with the intake passage 10 at a position downstream of the throttle valve 11. Additionally, in the EGR passage 32, an EGR cooler 33 for cooling the exhaust gas to be recirculated, and an EGR valve 34 for controlling a flow rate of the exhaust gas passing through the EGR passage 32 are provided.

Further in the exhaust passage 30, a turbine bypass passage 35 for causing the exhaust gas to bypass the turbine 4b of the turbocharger 4 is formed. A wastegate valve (hereinafter, referred to as "the WG valve") 36 for controlling a flow rate of the exhaust gas passing through the turbine bypass passage 35 is provided to the turbine bypass passage 35.

Moreover, various sensors are provided in the engine 100 illustrated in FIG. 1. Specifically, in the intake system of the engine 100, an airflow sensor 61 for detecting an intake air flow rate and a first temperature sensor 62 for detecting an intake air temperature are provided in the intake passage 10 at positions downstream of the air cleaner 2 (specifically, positions between the air cleaner 2 and the compressor 4a), a first pressure sensor 63 for detecting turbocharging pressure is provided in the intake passage 10 at a position between the compressor 4a and the throttle valve 11, and a second pressure sensor 64 for detecting an intake-manifold pressure which is a pressure inside the surge tank 13a is provided in the intake passage 10 at a position downstream of the throttle valve 11 (specifically, inside the surge tank 13a). A temperature sensor for detecting an intake-manifold temperature which is a temperature inside the surge tank 13a is built in the second pressure sensor 64.

Further, in the engine body 20, a crank angle sensor 69 for detecting a crank angle of the crankshaft 28, an intake cam angle sensor 70 for detecting a cam angle of the intake camshaft, and an exhaust cam angle sensor 71 for detecting a cam angle of the exhaust camshaft are provided.

Moreover, in the exhaust system of the engine 100, an EGR opening sensor 65 for detecting an EGR opening which is an opening of the EGR valve 34, and a WG opening sensor 66 for detecting a WG opening which is an opening of the WG valve 36 are provided. An $O_2$ sensor 67 for detecting an oxygen concentration within the exhaust gas, and an exhaust gas temperature sensor 68 for detecting an exhaust gas temperature are provided in the exhaust passage 30 at positions downstream of the turbine 4b (specifically, positions between the turbine 4b and the exhaust emission control catalyst 37).

The airflow sensor 61 supplies to the ECU 50 a detection signal S61 corresponding to the detected intake air flow rate. The first temperature sensor 62 supplies to the ECU 50 a detection signal S62 corresponding to the detected intake air temperature, and the first pressure sensor 63 supplies to the ECU 50 a detection signal S63 corresponding to the detected turbocharging pressure. The second pressure sensor 64 supplies to the ECU 50 a detection signal S64 corresponding to the detected intake-manifold pressure and temperature. The EGR opening sensor 65 supplies to the ECU 50 a detection signal S65 corresponding to the detected EGR opening. The WG opening sensor 66 supplies to the ECU 50 a detection signal S66 corresponding to the detected WG opening. The $O_2$ sensor 67 supplies to the ECU 50 a detection signal S67 corresponding to the detected oxygen concentration. The exhaust gas temperature sensor 68 supplies to the ECU 50 a detection signal S68 corresponding to the detected exhaust gas temperature. The crank angle sensor 69 supplies to the ECU 50 a detection signal S69 corresponding to the detected crank angle. The intake and exhaust cam angle sensors 70 and 71 supply to the ECU 50 detection signals S70 and S71 corresponding to the detected cam angles, respectively. Further, the engine 100 is provided with an atmospheric pressure sensor 60 for detecting an atmospheric pressure, and the atmospheric pressure sensor 60 supplies to the ECU 50 a detection signal S60 corresponding to the detected atmospheric pressure.

The ECU 50 includes a computer comprised of a processor 55 (see FIG. 2) and internal memories, such as ROMs and RAMs for storing various programs which are executed by the processor 55, and various data. The various programs include a basic control program (e.g., operating system (OS)) and an application program which is activated by the OS and realizes a particular function. The ECU 50 performs various controls and operations based on the detection signals transmitted from the various sensors described above.

For example, in response to a request from a driver of the vehicle, the ECU 50 sets an opening of the throttle valve 11, a fuel injection amount of each fuel injector 23, etc., estimates an exhaust gas temperature, and adjusts the fuel injection amount and the open and close timings of the intake and exhaust valves 22 and 29 according to the exhaust gas temperature.

Figure 2:
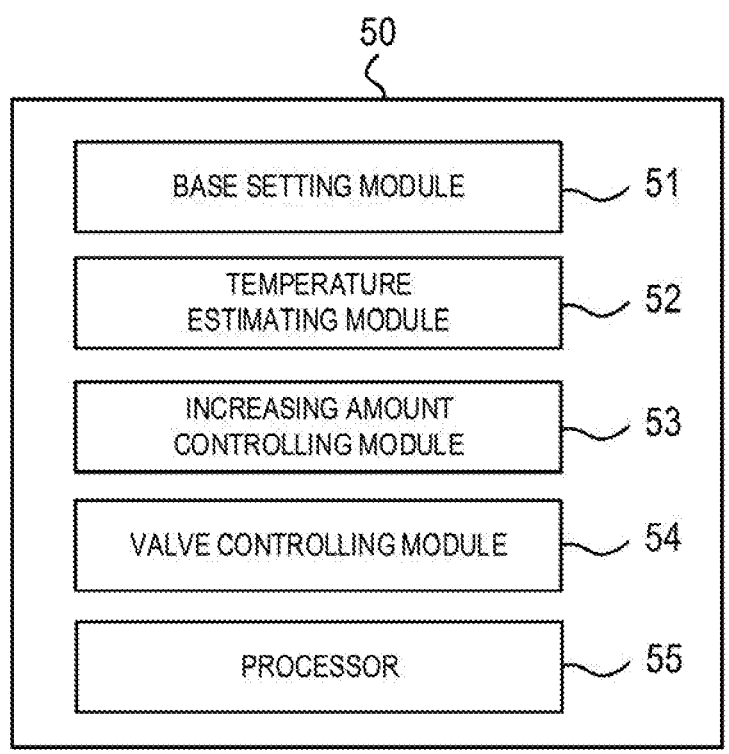
FIG. 2 is a function block diagram of an Electronic Control Unit (ECU).

FIG. 2 is a function block diagram of the ECU 50, which includes several program modules, which are software stored in non-volatile memory or firmware, and which are executed by the processor 55 of the ECU 50. Specifically, the ECU 50 includes a base setting module 51 for performing a torque base control in which base values in controls of the throttle valve 11 etc. are set, a temperature estimating module 52 for estimating the exhaust gas temperature, an increasing amount controlling module 53 for performing a fuel amount increase control in which the injection amount is increased to decrease the exhaust gas temperature, a valve controlling module 54 for controlling an overlapping period of the intake and exhaust valves 22 and 29, and the processor 55 for executing the various modules of the ECU 50.

The base setting module 51 obtains a required torque (hereinafter, referred to as "the target torque") based on an operating state of the engine 100, and sets base values of the opening of the throttle valve 11, the opening of the WG valve 36, an ignition timing of each ignition plug 24, the open and close timings of each intake valve 22, the open and close timings of each exhaust valve 29, and the injection amount of the fuel injector 23, etc., according to the target torque. Each of the base values is changed variously according to the target torque.

The temperature estimating module 52 estimates the exhaust gas temperature by calculating a gain and loss of heat of the exhaust gas from the cylinder 21 to the exhaust emission control catalyst 37. The temperature estimating module 52 estimates the exhaust gas temperature in various parts of the exhaust passage 30 (e.g., upstream of the turbine 4b, the $O_2$ sensor 67, and the exhaust emission control catalyst 37).

The increasing amount controlling module 53 increases the injection amount set by the base setting module 51, according to the exhaust gas temperatures estimated by the temperature estimating module 52. In other words, the increasing amount controlling module 53 controls the fuel injector 23 to inject a sufficient amount of fuel in achieving the target torque. By increasing the fuel amount as above, a temperature inside the cylinder 21 is decreased by latent heat of vaporization of the fuel, and as a result, the exhaust gas temperatures are decreased.

The valve controlling module 54 basically controls the intake and exhaust VVTs 25 and 26 to realize the open and close timings of the intake and exhaust valves 22 and 29 set by the base setting module 51. Depending on the operating state of the engine 100, the open and close timings of the intake and exhaust valves 22 and 29 may be adjusted so that the open timing of the intake valve 22 overlaps with the open timing of the exhaust valve 29 on intake stroke. In such a case, the valve controlling module 54 performs a valve overlap control in which the intake and exhaust valves 22 and 29 are both opened on the intake stroke. By performing the valve overlap control, fresh air sucked into the cylinder 21 via the intake port 14 is discharged from the exhaust port 31 as it is. The valve overlap control is performed to, for example, stimulate scavenging of the cylinder 21, decrease the temperature of the cylinder 21, or increase a turbine flow rate.

Additionally, the valve controlling module 54 adjusts the overlapping period which is a period in which the intake and exhaust valves 22 and 29 are both opened. Specifically, when the exhaust gas temperatures estimated by the temperature estimating module 52 are high, the valve controlling module 54 adjusts the overlapping period to reduce an overlapping amount between the open timings of the intake and exhaust valves 22 and 29.

<Torque Base Control>

Figure 3:
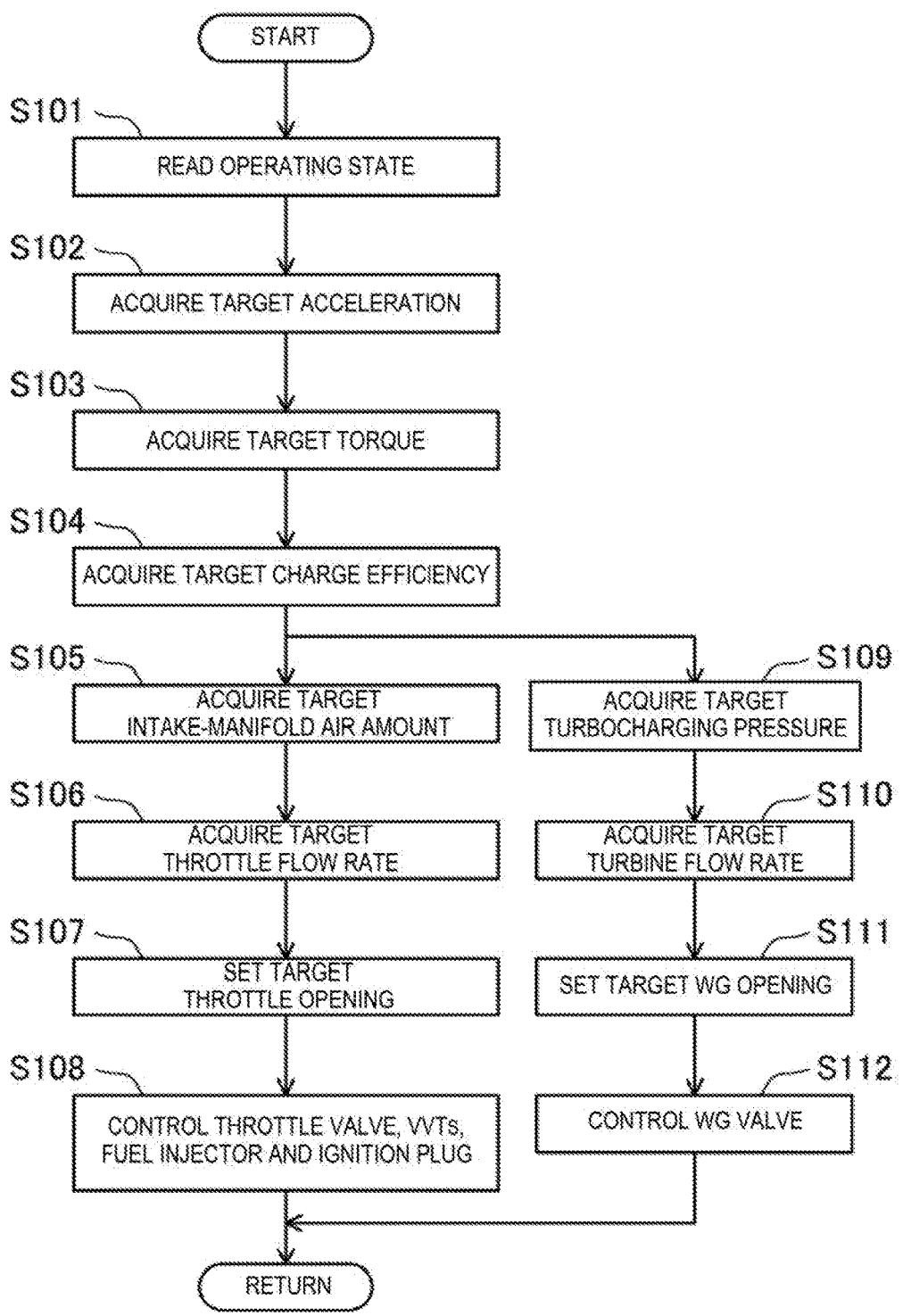
FIG. 3 is a flowchart of base setting.

First, a torque base control is described in detail with reference to a flowchart of FIG. 3. FIG. 3 is a flowchart of base setting.

First at S101, the base setting module 51 acquires the operating state of the engine 100. Specifically, a speed of the engine body 20 (hereinafter, referred to as "the engine speed"), a vehicle speed, an accelerator opening, a transmission ratio, etc. are read based on detection results of the various sensors. For example, the engine speed is acquired based on the detection result of the crank angle sensor 69.

Next, the base setting module 51 obtains a target acceleration according to the acquired operating state (S102). Further, the base setting module 51 obtains the target torque required to achieve the target acceleration (S103).

Moreover, at S104, the base setting module 51 obtains a target value of a charge efficiency of the fresh air required to achieve the target torque (hereinafter, referred to as "the target charge efficiency"). Specifically, the target charge efficiency is obtained based on the target torque, the engine speed, and a target value of an indicated mean effective pressure (hereinafter, referred to as "the target indicated mean effective pressure"). The target indicated mean effective pressure is obtained based on the target torque, and also a mechanical resistance and a pumping loss which correspond to a torque loss.

The base setting module 51 sets the base values of the open and close timings of the intake and exhaust valves 22 and 29 based on the target charge efficiency set as above. The base values of the open and close timings of the intake valve 22 are obtained based on an intake VVT map stored in advance in the internal memory of the ECU 50 and in which the engine speed and the target charge efficiency, and the open and close timings of the intake valve 22 are defined in association with each other. Similarly, the base values of the open and close timings of the exhaust valve 29 are obtained based on an exhaust VVT map stored in advance in the internal memory of the ECU 50 and in which the engine speed and the target charge efficiency, and the open and close timings of the exhaust valve 29 are defined in association with each other. Basically, the base values of the open and close timings of the intake valve 22 are set so that the intake valve 22 opens on the intake stroke and closes on compression stroke after the piston 27 passes a bottom dead center. In other words, the intake valve 22 is designed to perform so-called late closing. Further, depending on the engine speed and the target charge efficiency, the base values of the open and close timings of the exhaust valve 29 are set so that the overlapping period is provided on the intake stroke.

After S104, S105 to S108 and S109 to S112 are performed in parallel to each other.

At S105, the base setting module 51 obtains a target value of the intake air amount inside the intake manifold 13 (hereinafter, referred to as "the target intake-manifold air amount") required to achieve the target charge efficiency. The target intake-manifold air amount is obtained based on the intake-manifold temperature detected by the second pressure sensor 64, a target value of the intake-manifold pressure (hereinafter, referred to as "the target intake-manifold pressure"), and the open and close timings of the intake valve 22. The target intake-manifold pressure is obtained based on an intake characteristics map stored in advance in the internal memory of the ECU 50 and in which the target intake-manifold air amount and the intake-manifold temperature, and the target intake-manifold pressure are defined in association with each other.

At S106, the base setting module 51 obtains a target value of the flow rate of the intake air passing through the throttle valve 11 (hereinafter, referred to as "the target throttle flow rate") required to achieve the target intake-manifold air amount. The target throttle flow rate is obtained based on the target charge efficiency obtained at S104, the target intake-manifold air amount obtained at S105, and an estimated value of a current intake-manifold air amount (hereinafter, referred to as "the actual intake-manifold air amount"). The actual intake-manifold air amount is estimated based on the intake-manifold pressure and temperature detected by the second pressure sensor 64. Note that the actual intake-manifold air amount may be estimated by calculating a gain and loss between an amount of air flowing into the intake manifold 13 and an amount of air flowing into the cylinder 21 from the intake manifold 13.

At S107, the base setting module 51 obtains a target value of the opening of the throttle valve 11 (hereinafter, referred to as "the target throttle opening") required to achieve the target throttle flow rate. The target throttle opening is obtained based on the target throttle flow rate, the intake pressure upstream of the throttle valve 11 (turbocharging pressure), which is detected by the first pressure sensor 63, and the intake pressure downstream of the throttle valve 11, which is detected by the second pressure sensor 64.

At S108, the base setting module 51 also obtains the base values for the fuel injector 23 and the ignition plug 24, based on suitable maps stored in advance in the internal memory of the ECU 50. For example, the base setting module 51 sets the injection amount of the fuel injector 23 based on the target charge efficiency, and sets the ignition timing of the ignition plug 24 to achieve the target torque. Then, the base setting module 51 outputs control signals corresponding to control values (base values) to the intake valve 22, the fuel injector 23, the ignition plug 24, and the intake and exhaust VVTs 25 and 26.

On the other hand, at S109, the base setting module 51 obtains a target value of the turbocharging pressure (hereinafter, referred to as "the target turbocharging pressure") required to achieve the target charge efficiency. The target turbocharging pressure is obtained based on a turbocharging pressure map stored in advance in the internal memory of the ECU 50 and in which the engine speed, the target charge efficiency, and the open and close timings of the intake valve 22, and the target turbocharging pressure are defined in association with each other.

At S110, the base setting module 51 obtains a target value of the flow rate through the turbine 4b (hereinafter, referred to as "the target turbine flow rate") based on the target turbocharging pressure. Specifically, the target turbine flow rate is obtained based on a target value of a compressor drive force (target compressor drive force), the engine speed, etc. The target compressor drive force is obtained based on the target turbocharging pressure.

At S111, the base setting module 51 sets a target value of the opening of the WG valve 36 (hereinafter, referred to as "the target WG opening") required to achieve the target turbine flow rate. The target WG opening is obtained based on the target turbine flow rate and a total flow rate of the exhaust gas.

Then, at S112, the base setting module 51 outputs a control signal to the WG valve 36 to cause it to open at the target WG opening.

Note that the order of these steps is an example and may suitably be changed, or some of these steps may be performed in parallel. For example, S105 to S108 and S109 to S112 may be performed one by one, instead of being performed in parallel.

As above, the base setting module 51 sets the respective base values of the opening of the throttle valve 11, the injection amount of the fuel injector 23, the ignition timing of the ignition plug 24, the open and close timings of the intake and exhaust valves 22 and 29, and the opening of the WG valve 36.

<Temperature Estimation>

Figure 4:
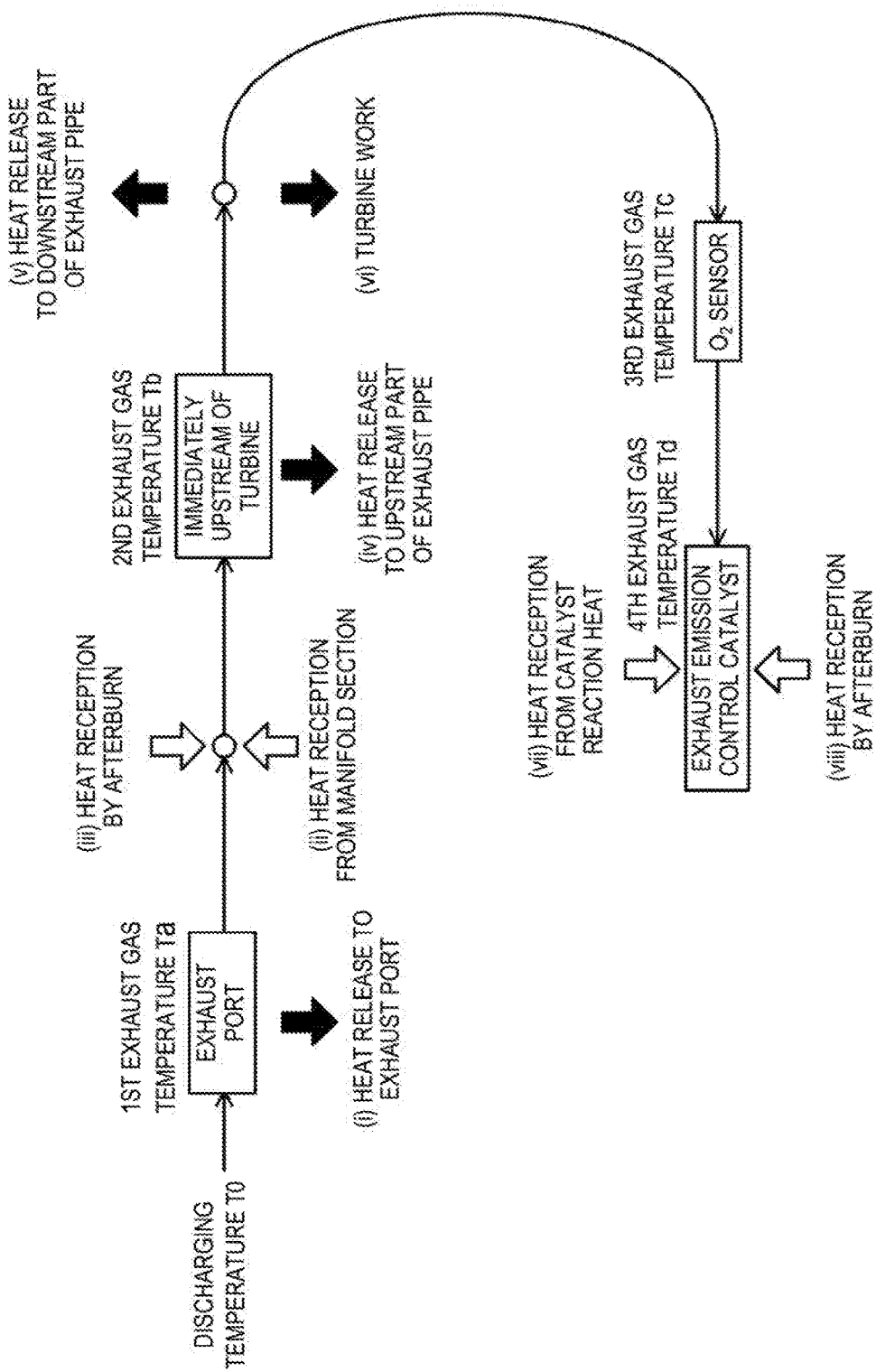
FIG. 4 is a view illustrating an operation model used for estimating an exhaust gas temperature.

Next, a temperature estimation of the temperature estimating module 52 is described in detail with reference to FIG. 4. FIG. 4 is a view illustrating an operation model used for estimating the exhaust gas temperatures.

The temperature estimating module 52 estimates the gain and loss in heat release and reception in a period from the exhaust gas being discharged from the cylinder until it reaches the exhaust emission control catalyst 37, and estimates the exhaust gas temperatures at the plurality of locations in the exhaust system. Specifically, the temperature estimating module 52 estimates (A) a first exhaust gas temperature Ta at an exit of each exhaust port 31, (B) a second exhaust gas temperature Tb at a position immediately upstream of the turbine 4b, (C) a third exhaust gas temperature Tc at the $O_2$ sensor 67, and (D) a fourth exhaust gas temperature Td at the exhaust emission control catalyst 37. For the gain and loss of the heat, the temperature estimating module 52 takes into consideration (i) heat release to the exhaust port 31 cooled by the fresh air blowing therethrough, (ii) heat reception from the manifold section 30b of the exhaust pipe, (iii) heat reception caused by afterburn at a position of the exhaust pipe upstream of the turbine 4b, (iv) heat release to a part of the exhaust pipe upstream of the turbine 4b (the upstream of the turbine 4b includes the exhaust manifold and a turbine housing), (v) heat release to a part of the exhaust pipe downstream of the turbine 4b and upstream of the exhaust emission control catalyst 37, (vi) a heat loss caused by the work of the turbine, (vii) heat reception from reaction heat of the exhaust emission control catalyst 37, and (viii) heat reception caused by afterburn at the exhaust emission control catalyst 37.

Figure 5:
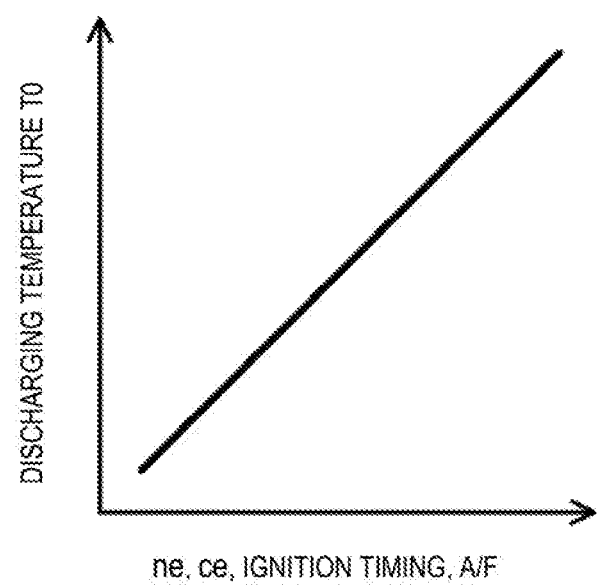
FIG. 5 is an image chart of an exhaust gas temperature map.

Specifically, the temperature estimating module 52 first estimates a temperature of the exhaust gas combusted in and discharged from the cylinder 21 (hereinafter, referred to as "the discharging temperature") T0. The discharging temperature T0 is calculated based on the engine speed, the charge efficiency, the ignition timing (retarded amount), and an air-fuel ratio. The internal memory of the ECU 50 stores in advance an exhaust gas temperature map in which the discharging temperature T0 based on the engine speed, the charge efficiency, the ignition timing, and the air-fuel ratio is defined. FIG. 5 is an image chart of the exhaust gas temperature map in which the discharging temperature T0 becomes higher as the engine speed increases, the charge efficiency increases, the ignition timing is retarded, and the air-fuel ratio increases. The temperature estimating module 52 obtains the discharging temperature T0 by comparing the engine speed, the charge efficiency, the ignition timing, and the air-fuel ratio with the exhaust gas temperature map. Note that various maps used for the temperature estimation by the temperature estimating module 52, including the exhaust gas temperature map, are unique to every engine 100 and obtained in advance by actual measurements etc. Therefore, the exhaust gas temperature map of FIG. 5 and various maps described later are merely examples, and they may indicate different characteristics depending on the engine.

The temperature estimating module 52 obtains an amount of decrease of the exhaust gas temperature due to (i) the heat release to the exhaust port 31 cooled by the fresh air blowing therethrough (hereinafter, the decrease amount is referred to as "the first temperature decrease amount $\Delta Te1$"). Because of the fresh air blowing through the exhaust port 31, the exhaust port 31, in other words, a cylinder head of the engine, is cooled. Thus, the exhaust gas passing through the exhaust port 31 is also cooled, and the exhaust gas temperature decreases. The first temperature decrease amount $\Delta Te1$ of the exhaust gas resulting from the blow-through of the fresh air increases as a flow rate of the fresh air blowing through increases (i.e., the exhaust gas is cooled more).

Figure 6:
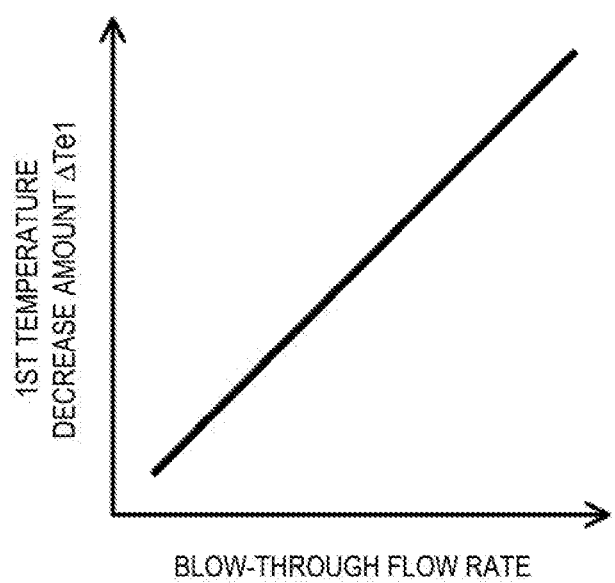
FIG. 6 is an image chart of a blow-through cooling map.

First, the temperature estimating module 52 calculates the blow-through flow rate. Specifically, the temperature estimating module 52 calculates a base value of a blow-through rate based on the intake pressure (the intake-manifold pressure detected by the second pressure sensor 64), and the overlapping amount of the intake and exhaust valves 22 and 29 (i.e., overlapping period). The overlapping amount is obtained based on the open and close timings of the intake and exhaust valves 22 and 29. The internal memory of the ECU 50 stores in advance a blow-through rate map in which the base value of the blow-through rate based on the intake pressure and the overlapping amount is defined. The temperature estimating module 52 obtains the base value of the blow-through rate by comparing the intake pressure and the overlapping amount with the blow-through rate map. Further, the internal memory of the ECU 50 stores in advance a correction map in which a correction term of the blow-through rate based on the engine speed is defined. The temperature estimating module 52 obtains the correction term of the blow-through rate by comparing the engine speed with the correction map. Then, the temperature estimating module 52 obtains an applied value of the blow-through rate by multiplying the base value of the blow-through rate by the correction term thereof. Additionally, the temperature estimating module 52 calculates the blow-through flow rate by multiplying an intake air flow rate by the blow-through rate. The intake air flow rate may be the intake air flow rate detected by the airflow sensor 61. The internal memory of the ECU 50 stores in advance a blow-through cooling map in which the first temperature decrease amount $\Delta Te1$ based on the blow-through flow rate is defined. FIG. 6 is an image chart of the blow-through cooling map in which the first temperature decrease amount $\Delta Te1$ increases as the blow-through flow rate increases. The temperature estimating module 52 obtains an applied value of the first temperature decrease amount $\Delta Te1$ by comparing the blow-through flow rate with the blow-through cooling map.

The temperature estimating module 52 obtains the first exhaust gas temperature Ta at the exit of the exhaust port 31 by subtracting the first temperature decrease amount $\Delta Te1$ from the discharging temperature T0.

Figure 7:
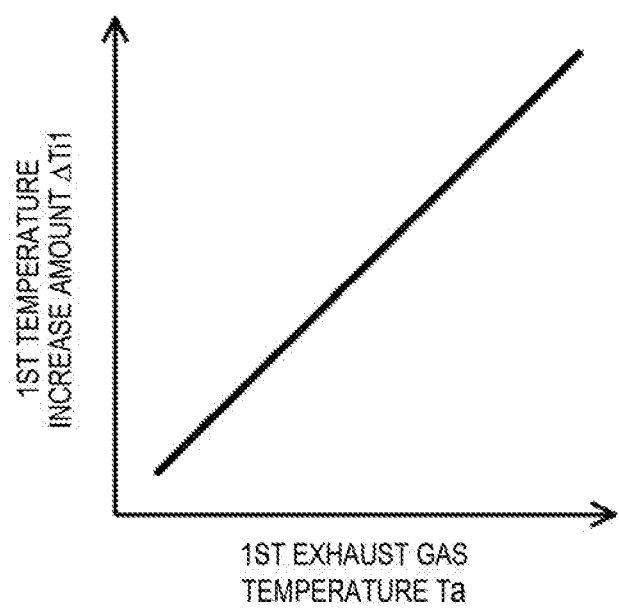
FIG. 7 is an image chart of a manifold section temperature increase map.

The temperature estimating module 52 obtains an increase amount of the exhaust gas temperature due to (ii) the heat reception from the manifold section 30b of the exhaust pipe (hereinafter, this increase amount is referred to as "the first temperature increase amount $\Delta Ti1$"). In other words, the exhaust gas is intermittently discharged at a high temperature from the exhaust port 31 of each cylinder in a combustion order of the cylinders 21. The exhaust gas intermittently discharged from each cylinder 21 passes through the corresponding branched pipe 30a and eventually reaches the manifold section 30b. Therefore, since the exhaust gas from the plurality of cylinders sequentially flows into the manifold section 30b, a temperature of the manifold section 30b increases compared with the branched pipes 30a. Since the temperature of the manifold section 30b increases as above, the exhaust gas is increased in temperature by passing through the manifold section 30b. The internal memory of the ECU 50 stores in advance a manifold section temperature increase map in which the first temperature increase amount $\Delta Ti1$ based on the first exhaust gas temperature Ta is defined. FIG. 7 is an image chart of the manifold section temperature increase map in which the first temperature increase amount $\Delta Ti1$ increases as the first exhaust gas temperature Ta increases (i.e., the exhaust gas is heated more). The temperature estimating module 52 obtains the first temperature increase amount $\Delta Ti1$ by comparing the first exhaust gas temperature Ta with the manifold section temperature increase map.

Figure 8:
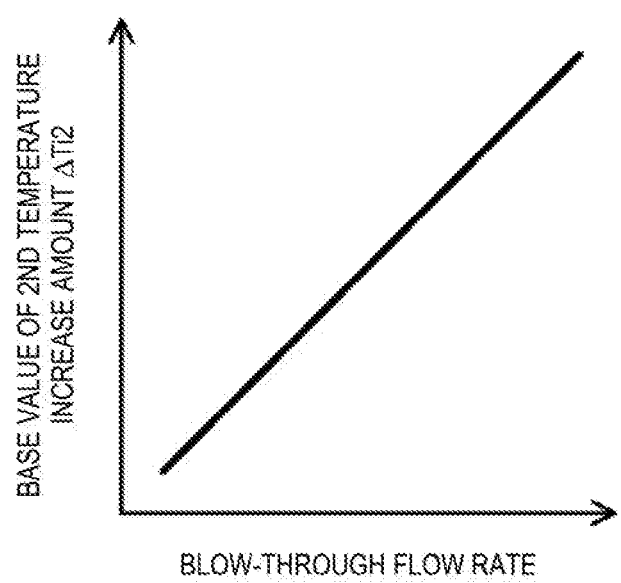
FIG. 8 is an image chart of a first afterburn map.
Figure 9:
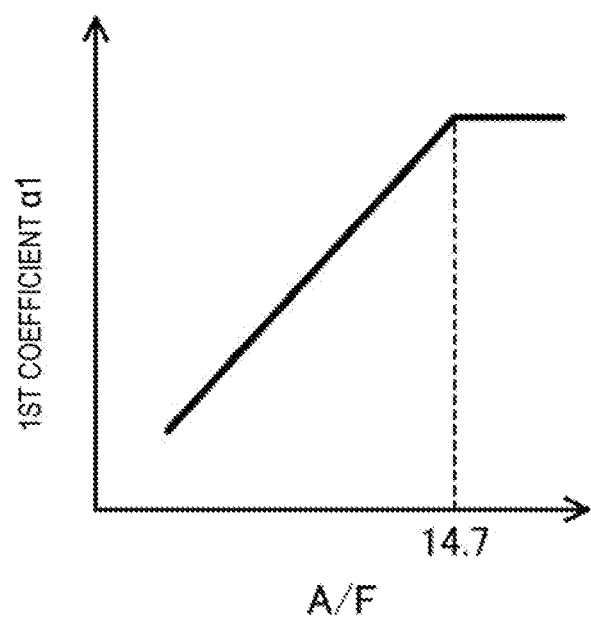
FIG. 9 is an image chart of a first coefficient map.

The temperature estimating module 52 obtains an increase amount of the exhaust gas temperature due to (iii) the heat reception caused by the afterburn in the upstream part of the exhaust pipe (hereinafter, this increase amount is referred to as "the second temperature increase amount $\Delta Ti2$"). When the blow-through of the fresh air occurs, the fresh air flows into the exhaust pipe. Therefore, if the exhaust gas contains the unburned fuel, the fresh air reacts with the unburned fuel in the exhaust pipe and a so-called afterburn occurs. Particularly since the temperature of the exhaust gas increases in the manifold section 30b of the exhaust pipe, the afterburn easily occurs. The internal memory of the ECU 50 stores in advance a first afterburn map in which a base value of the second temperature increase amount $\Delta Ti2$ based on the blow-through flow rate is defined, and a first coefficient map in which a coefficient based on the air-fuel ratio (hereinafter, referred to as "the first coefficient $\alpha 1$") is defined. FIG. 8 is an image chart of the first afterburn map in which the base value of the second temperature increase amount $\Delta Ti2$ increases as the blow-through flow rate increases (i.e., the exhaust gas is heated more). FIG. 9 is an image chart of the first coefficient map in which the first coefficient $\alpha 1$ decreases (i.e., the exhaust gas is heated less) as the air-fuel ratio shifts to be richer (the air-fuel ratio decreases) from a stoichiometric ratio (14.7:1). This is because an influence of the cooling effect caused by the latent heat of the vaporization increases as the air-fuel ratio becomes richer. The temperature estimating module 52 obtains the base value of the second temperature increase amount $\Delta Ti2$ by comparing the blow-through flow rate with the first afterburn map, and the first coefficient $\alpha 1$ by comparing the air-fuel ratio with the first coefficient map. The temperature estimating module 52 obtains an applied value of the second temperature increase amount $\Delta Ti2$ by multiplying the base value of the second temperature increase amount $\Delta Ti2$ by the first coefficient $\alpha 1$.

Figure 10:
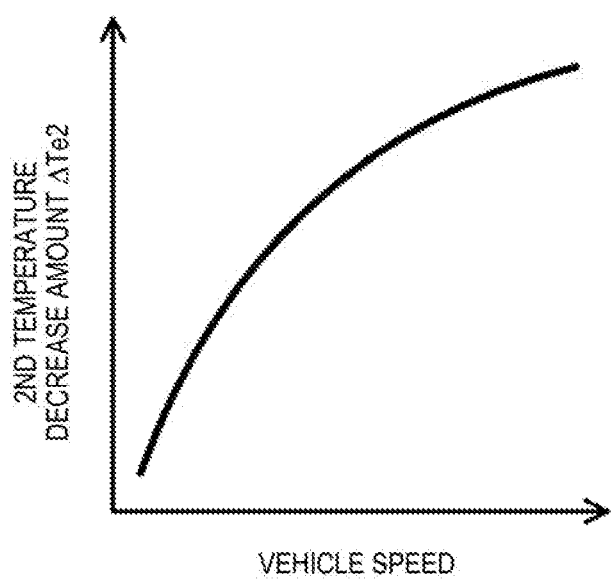
FIG. 10 is an image chart of an upstream-side vehicle speed heat release map.

The temperature estimating module 52 obtains a decrease amount of the exhaust gas temperature due to (iv) the heat release to the upstream part of the exhaust pipe (hereinafter, this decrease amount is referred to as "the second temperature decrease amount $\Delta Te2$"). A traveling wind blows around the engine body 20 and the exhaust system, and the engine body 20 and the exhaust system are cooled by the traveling wind. For example, in the case where the turbocharger 4 is provided as it is in the engine 100, the turbocharger 4 is structured so that the traveling wind is introduced to a circumference of the turbine housing accommodating the turbine 4b, and the upstream part of the exhaust pipe including the turbine housing is cooled well. Therefore, the heat release of the exhaust gas to the upstream part of the exhaust pipe when the exhaust gas passes therethrough increases. The internal memory of the ECU 50 stores in advance an upstream-side vehicle speed heat release map in which the second temperature decrease amount $\Delta Te2$ based on the vehicle speed is defined. FIG. 10 is an image chart of the upstream-side vehicle speed heat release map in which the second temperature decrease amount $\Delta Te2$ increases as the vehicle speed increases (i.e., the exhaust gas is cooled more). The temperature estimating module 52 obtains the second temperature decrease amount $\Delta Te2$ by comparing the vehicle speed with the upstream-side vehicle speed heat release map.

Note that although the heat release to the upstream part of the exhaust pipe also is influenced by the exhaust gas flow rate (intake air flow rate) and an outdoor air temperature, in this example, the vehicle speed causes a dominant influence. Therefore, the second temperature decrease amount $\Delta Te2$ is determined based on the vehicle speed alone. However, the second temperature decrease amount $\Delta Te2$ may be determined by accounting for one of the exhaust gas flow rate and the outdoor air temperature.

Figure 11:
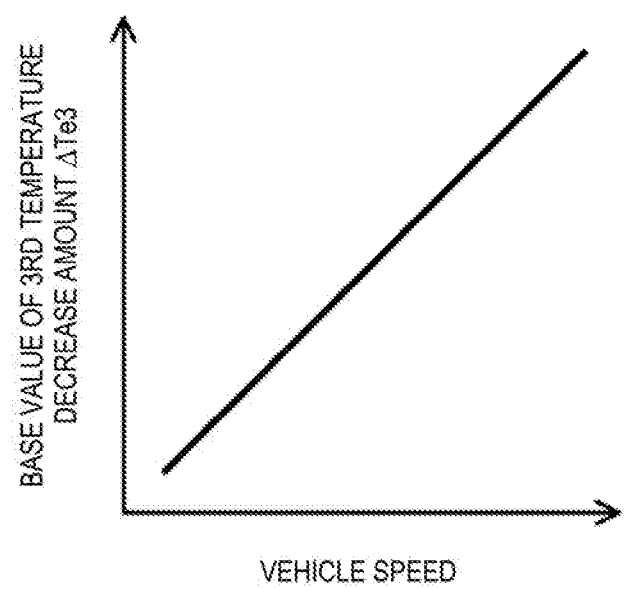
FIG. 11 is an image chart of a downstream-side vehicle speed heat release map.
Figure 12:
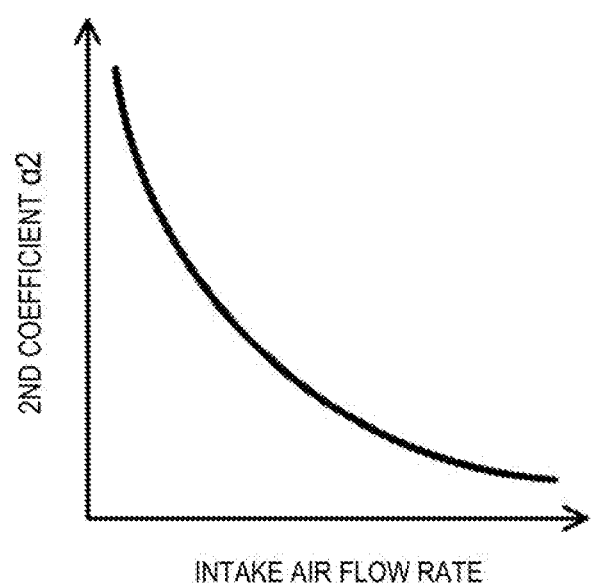
FIG. 12 is an image chart of a second coefficient map.
Figure 13:
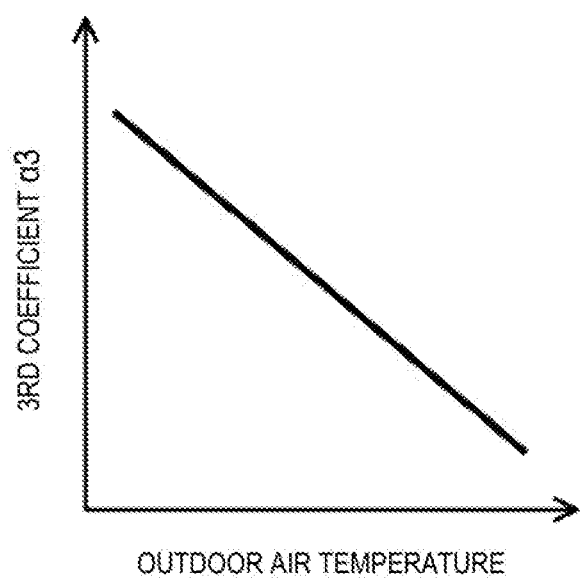
FIG. 13 is an image chart of a third coefficient map.

The temperature estimating module 52 obtains a decrease amount of the exhaust gas temperature due to (v) the heat release to the downstream part of the exhaust pipe (hereinafter, this decrease amount is referred to as "the third temperature decrease amount $\Delta Te3$"). The exhaust gas releases heat also to the part of the exhaust pipe downstream of the turbine 4b, in addition to the upstream part of the exhaust pipe described above. With (iv) the heat release to the upstream part of the exhaust pipe, since the vehicle speed causes the dominant influence thereon, only the vehicle speed is taken into consideration, whereas with (v) the heat release to the downstream part of the exhaust pipe, the influence from the vehicle speed is relatively small, and the exhaust gas flow rate (the intake air flow rate) and the outdoor air temperature also have influence. The internal memory of the ECU 50 stores in advance a downstream-side vehicle speed heat release map in which a base value of the third temperature decrease amount $\Delta Te3$ based on the vehicle speed is defined, a second coefficient map in which a coefficient based on the intake air flow rate (hereinafter, referred to as "the second coefficient $\alpha 2$ ") is defined, and a third coefficient map in which a coefficient based on the outdoor air temperature (hereinafter, referred to as "the third coefficient $\alpha 3$") is defined. FIG. 11 is an image chart of the downstream-side vehicle speed heat release map in which the third temperature decrease amount $\Delta Te3$ increases as the vehicle speed increases (i.e., the exhaust gas is cooled more). FIG. 12 is an image chart of the second coefficient map in which the second coefficient $\alpha 2$ decreases as the intake air flow rate increases (i.e., the exhaust gas is cooled less). FIG. 13 is an image chart of the third coefficient map in which the third coefficient $\alpha 3$ decreases as the outdoor air temperature increases (i.e., the exhaust gas is cooled less). The temperature estimating module 52 uses the intake air flow rate as a value relating to the exhaust gas flow rate. The temperature estimating module 52 uses the intake air temperature detected by the first temperature sensor 62 as the outdoor air temperature. The temperature estimating module 52 obtains the base value of the third temperature decrease amount $\Delta Te3$ by comparing the vehicle speed with the downstream-side vehicle speed heat release map, the second coefficient $\alpha 2$ by comparing the intake air flow rate with the second coefficient map, and the third coefficient $\alpha 3$ by comparing the outdoor air temperature with the third coefficient map. The temperature estimating module 52 obtains an applied value of the third temperature decrease amount $\Delta Te3$ by multiplying the base value of the third temperature decrease amount $\Delta Te3$ by the second and third coefficients $\alpha 2$ and $\alpha 3$.

Figure 14:
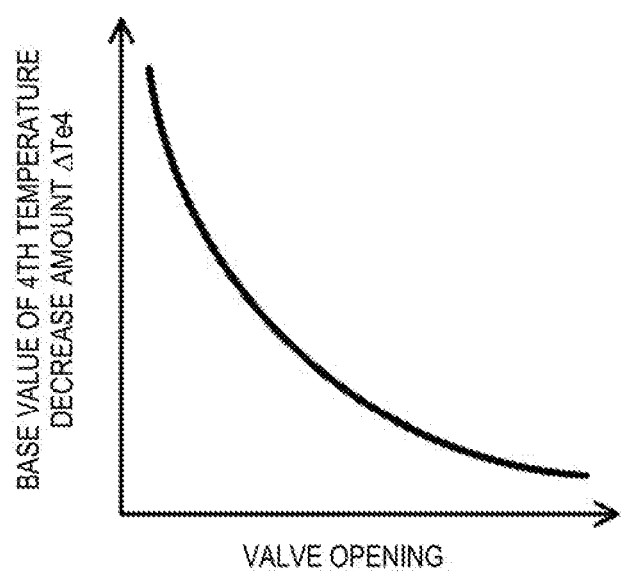
FIG. 14 is an image chart of a work loss map.
Figure 15:
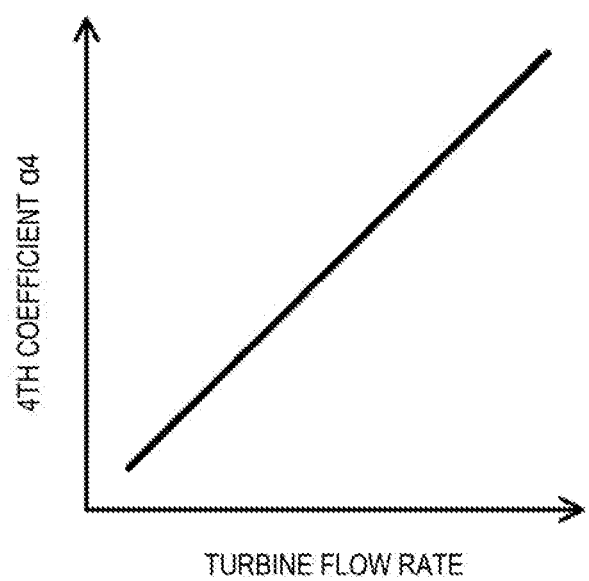
FIG. 15 is an image chart of a fourth coefficient map.

The temperature estimating module 52 obtains a decrease amount of the exhaust gas temperature due to (vi) the heat loss caused by the work of the turbine, (hereinafter, this decrease amount is referred to as "the fourth temperature decrease amount $\Delta Te4$"). When the exhaust gas rotates the turbine 4b, the heat amount of the exhaust gas is converted into the work of the turbine and the exhaust gas temperature decreases. The amount of work acting on the turbine 4b depends on the opening of the WG valve 36 and the turbine flow rate. The internal memory of the ECU 50 stores in advance a work loss map in which a base value of the fourth temperature decrease amount $\Delta Te4$ based on the opening of the WG valve 36 is defined, and a fourth coefficient map in which a coefficient based on the turbine flow rate (hereinafter, referred to as "the fourth coefficient $\alpha 4$") is defined. FIG. 14 is an image chart of the work loss map in which the fourth temperature decrease amount $\Delta Te4$ decreases as the opening of the WG valve 36 increases (i.e., the exhaust gas is cooled less). FIG. 15 is an image chart of the fourth coefficient map in which the fourth coefficient $\alpha 4$ increases as the turbine flow rate increases (i.e., the exhaust gas is cooled more). The temperature estimating module 52 obtains the base value of the fourth temperature decrease amount $\Delta Te4$ by comparing the opening of the WG valve 36 with the work loss map, and the fourth coefficient $\alpha 4$ by comparing the turbine flow rate with the fourth coefficient map. The temperature estimating module 52 obtains an applied value of the fourth temperature decrease amount $\Delta Te4$ by multiplying the base value of the fourth temperature decrease amount $\Delta Te4$ by the fourth coefficient $\alpha 4$.

Figure 16:
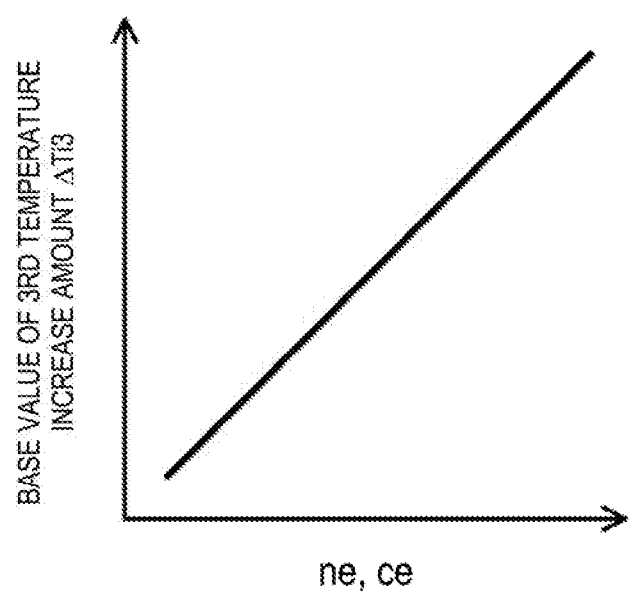
FIG. 16 is an image chart of a reaction heat map.
Figure 17:
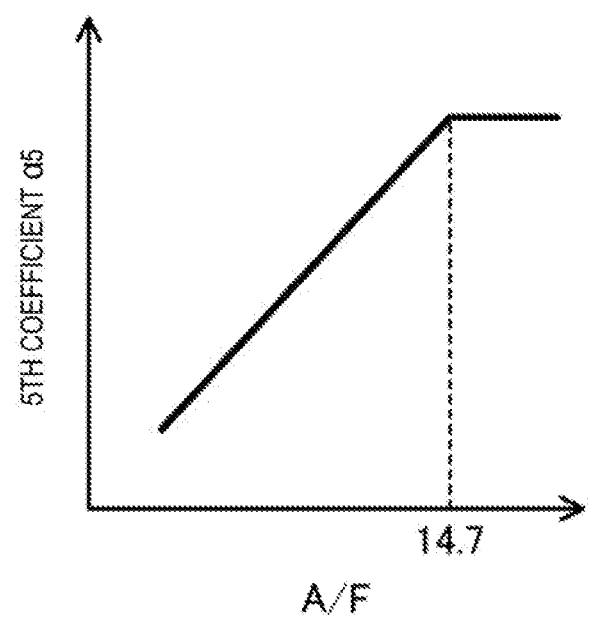
FIG. 17 is an image chart of a fifth coefficient map.

The temperature estimating module 52 obtains an increase amount of the exhaust gas temperature due to (vii) the heating by the reaction heat of the exhaust emission control catalyst 37 (hereinafter, this increase amount is referred to as "the third temperature increase amount $\Delta Ti3$"). The exhaust emission control catalyst 37 purifies the exhaust gas by reduction and/or oxidation, and produces the reaction heat during the purification. Thus, the exhaust gas temperature increases. The amount of reaction heat depends on amounts of $N_x$, CO and HC within the exhaust gas (corresponding to the engine speed and the charge efficiency), and purifying performance of the exhaust emission control catalyst 37 (corresponding to the air-fuel ratio). The internal memory of the ECU 50 stores in advance a reaction heat map in which a base value of the third temperature increase amount $\Delta Ti3$ based on the engine speed and the charge efficiency is defined, and a fifth coefficient map in which a coefficient based on the air-fuel ratio (hereinafter, referred to as "the fifth coefficient $\alpha 5$") is defined. FIG. 16 is an image chart of the reaction heat map in which the third temperature increase amount $\Delta Ti3$ increases as one of the engine speed and the charge efficiency increases (i.e., the exhaust gas is heated more). FIG. 17 is an image chart of the fifth coefficient map in which the fifth coefficient $\alpha 5$ decreases (i.e., the exhaust gas is heated less) as the air-fuel ratio shifts to be richer (the air-fuel ratio decreases) from the stoichiometric ratio (14.7:1). This is because the purification efficiency of the exhaust emission control catalyst 37 is high when the air-fuel ratio is stoichiometric, and decreases as the air-fuel ratio shifts to be richer. Note that in this example, even when the air-fuel ratio is lean, the fifth coefficient $\alpha 5$ does not change greatly. However, depending on the engine 100 and the exhaust emission control catalyst 37, the fifth coefficient $\alpha 5$ may become smaller as the air-fuel ratio shifts to be leaner. The temperature estimating module 52 obtains the base value of the third temperature increase amount $\Delta Ti3$ by comparing the engine speed and the charge efficiency with the reaction heat map, and the fifth coefficient $\Delta 5$ by comparing the air-fuel ratio with the fifth coefficient map. The temperature estimating module 52 obtains an applied value of the third temperature increase amount $\Delta Ti3$ by multiplying the base value of the third temperature increase amount $\Delta Ti3$ by the fifth coefficient $\alpha 5$.

Figure 18:
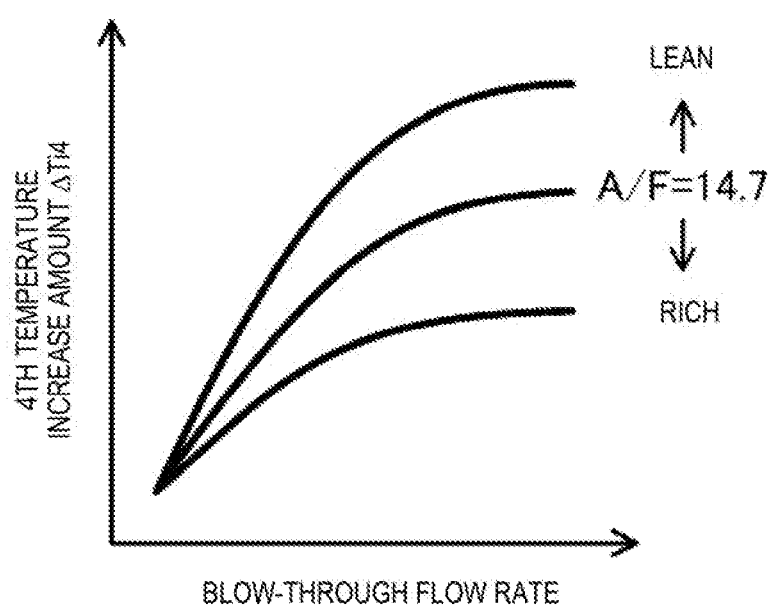
FIG. 18 is an image chart of a second afterburn map.

The temperature estimating module 52 obtains an increase amount of the exhaust gas temperature due to (viii) the heat reception caused by the afterburn at the exhaust emission control catalyst 37 (hereinafter, this increase amount is referred to as "the fourth temperature increase amount $\Delta Ti4$"). The afterburn during the blow-through of the fresh air occurs not only at the manifold section 30b described above, but also at the exhaust emission control catalyst 37. In other words, the unburned fuel within the exhaust gas does not completely burn in the manifold section 30b and the exhaust pipe downstream thereof, and a part of the unburned fuel remains unburned and reaches the exhaust emission control catalyst 37. As described above, since the exhaust emission control catalyst 37 is increased in temperature by the reaction heat, the remaining unburned fuel easily combusts at the exhaust emission control catalyst 37. Thus, the afterburn also occurs at the exhaust emission control catalyst 37. The internal memory of the ECU 50 stores in advance a second afterburn map in which the fourth temperature increase amount $\Delta Ti4$ based on the blow-through flow rate is defined. FIG. 18 is an image chart of the second afterburn map in which a characteristic of the fourth temperature increase amount $\Delta Ti4$ in relation to the blow-through flow rate is defined for every air-fuel ratio. When the air-fuel ratio is fixed, the fourth temperature increase amount $\Delta Ti4$ decreases as the blow-through flow rate increases (i.e., the exhaust gas is heated less). Further, when the blow-through flow rate is fixed, the fourth temperature increase amount $\Delta Ti4$ decreases (i.e., the exhaust gas is heated less) as the air-fuel ratio decreases (i.e., the air-fuel ratio becomes richer). This is because, when the air-fuel ratio is low, or in other words, when the fuel amount is relatively large, the afterburn is less likely to occur since the cooling effect caused by the latent heat of the vaporization of the fuel increases. When the fuel amount becomes relatively small, the influence of the heating by the afterburn becomes larger than that of the cooling by the latent heat of the vaporization of the fuel. The temperature estimating module 52 obtains the fourth temperature increase amount $\Delta Ti4$ by comparing the blow-through flow rate and the air-fuel ratio with the second afterburn map.

The temperature estimating module 52 estimates the exhaust gas temperatures at the plurality of locations in the exhaust system, by adding to or subtracting from the discharging temperature T0, with any of the first to fourth temperature increase amounts $\Delta Ti1$ to $\Delta Ti4$ and the first to fourth temperature decrease amounts $\Delta Te1$ to $\Delta Te4$ as needed. For example, the first exhaust gas temperature Ta is obtained by subtracting the first temperature decrease amount $\Delta Te1$ from the discharging temperature T0. The second exhaust gas temperature Tb is obtained by subtracting the first temperature decrease amount $\Delta Te1$ from the discharging temperature T0, adding the first and second temperature increase amounts $\Delta Ti1$ and $\Delta Ti2$ thereto, and then subtracting therefrom the second temperature decrease amount $\Delta Te2$. The third exhaust gas temperature Tc is obtained by subtracting the first temperature decrease amount $\Delta Te1$ from the discharging temperature T0, adding the first and second temperature increase amounts $\Delta Ti1$ and $\Delta Ti2$ thereto, and subtracting therefrom the second to fourth temperature decrease amounts $\Delta Te2$ to $\Delta Te4$. The fourth exhaust gas temperature Td is obtained by subtracting the first temperature decrease amount $\Delta Te1$ from the discharging temperature T0, adding the first and second temperature increase amounts $\Delta Ti1$ and $\Delta Ti2$ thereto, then subtracting therefrom the second to fourth temperature decrease amounts $\Delta Te2$ to $\Delta Te4$, and adding the third and fourth temperature increase amounts $\Delta Ti3$ and $\Delta Ti4$. Note that the temperature estimating module 52, when calculating the first to fourth exhaust gas temperatures Ta to Td, performs the calculations by suitably using a primary delay element, in consideration of heat capacities of the respective components of the exhaust system. Any of the discharging temperature T0, the first to fourth temperature increase amounts ΔTi1 to ΔTi4, and the first to fourth temperature decrease amounts ΔTe1 to ΔTe4 may be the primary delay element as needed.

According to the temperature estimation by the temperature estimating module 52 described above, even when the blow-through flow rate is high, the exhaust gas temperatures are estimated by accounting for the temperature increase of the exhaust gas caused by the afterburns. As a result, the exhaust gas temperatures are estimated accurately.

<Fuel Amount Increase>

Figure 19:
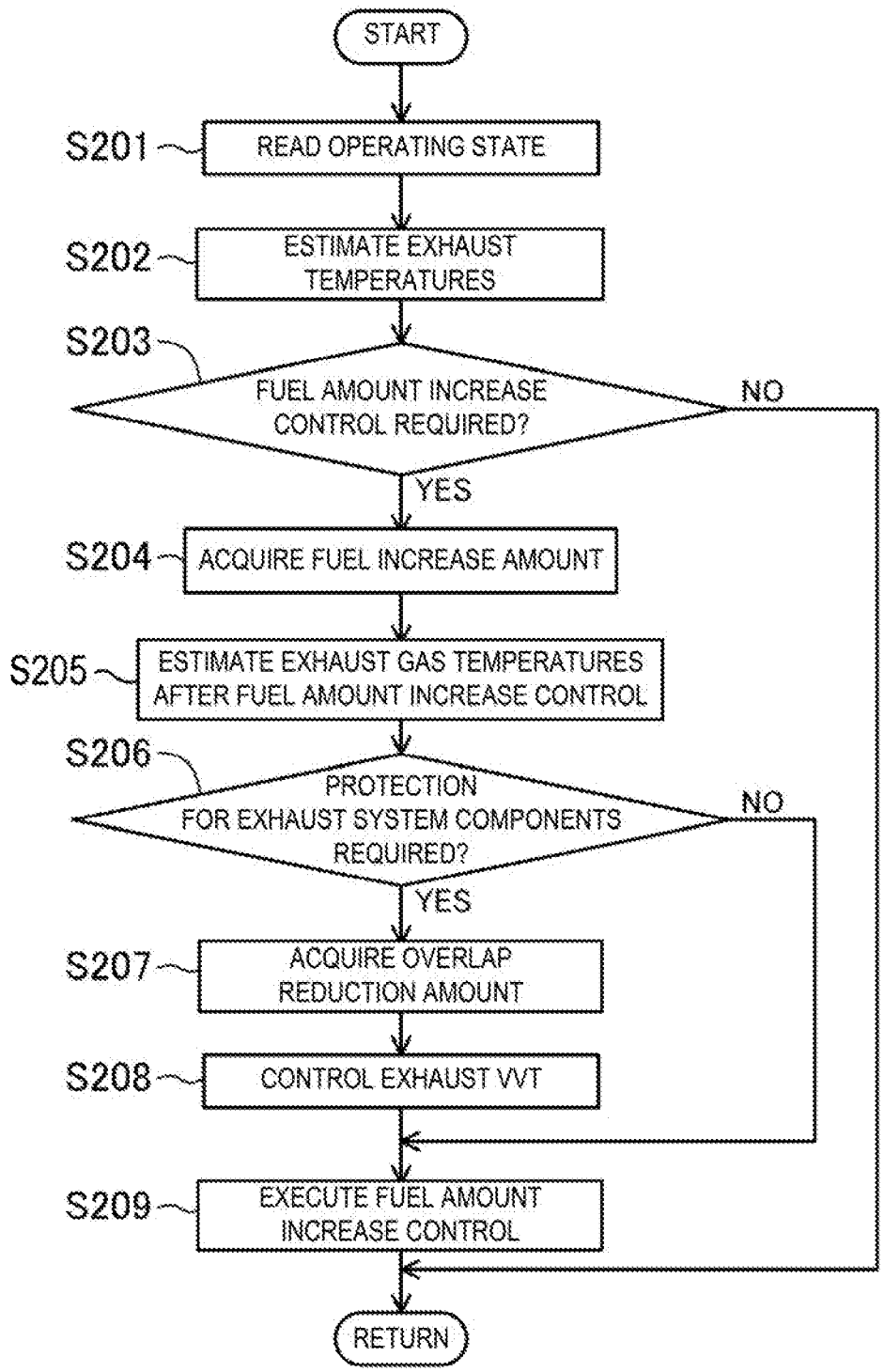
FIG. 19 is a flowchart illustrating processing of a fuel amount increase control.

Next, the fuel amount increase control by the increasing amount controlling module 53 and the overlapping period adjustment by the valve controlling module 54 in the control are described with reference to FIG. 19. FIG. 19 is a flowchart illustrating processing of the fuel amount increase control.

First at S201, the temperature estimating module 52 acquires the operating state of the engine 100. Specifically, the engine speed, the charge efficiency, the ignition timing, the air-fuel ratio, etc. are read based on the detection results of the various sensors.

Next at S202, the temperature estimating module 52 calculates the discharging temperature T0, the first to fourth temperature increase amounts ΔTi1 to ΔTi4, and the first to fourth temperature decrease amounts ΔTe1 to ΔTe4 based on the operating state read at S201, and estimates the exhaust gas temperatures Ta to Td at the respective locations in the exhaust system.

Subsequently at S203, among the exhaust gas temperatures estimated by the temperature estimating module 52, the increasing amount controlling module 53 reads the second exhaust gas temperature Tb at the position immediately upstream of the turbine 4b. Further, the increasing amount controlling module 53 determines whether the fuel amount increase control is required, based on the second exhaust gas temperature Tb. Specifically, when the second exhaust gas temperature Tb is above a given amount-increase determination temperature, it is determined that the second exhaust gas temperature Tb is required to be decreased in order to prevent an excessive temperature increase of the turbine 4b, and the fuel amount increase is requested. The amount-increase determination temperature is defined based on a guaranteed operation temperature of the turbine 4b and stored in the internal memory of the ECU 50 in advance. On the other hand, when the second exhaust gas temperature Tb is the amount-increase determination temperature or below, it is determined that the second exhaust gas temperature Tb is not required to be decreased, and the fuel amount increase is not requested and the control flow returns. Note that the configuration in which whether the fuel amount increase control is required is determined based on the comparison result between the second exhaust gas temperature Tb and the guaranteed operation temperature of the turbine 4b is merely an example, and it is not limited to this. For example, the determination may be performed by comparing the first exhaust gas temperature Ta (the exhaust gas temperature at the exit of the exhaust port 31) with an amount-increase determination temperature defined based on a guaranteed operation temperature of the exhaust port 31, performed by comparing the third exhaust gas temperature Tc (the exhaust gas temperature at the $O_2$ sensor 67) with an amount-increase determination temperature defined based on a guaranteed operation temperature of the $O_2$ sensor 67, performed by comparing the fourth exhaust gas temperature Td (the exhaust gas temperature at the exhaust emission control catalyst 37) with an amount-increase determination temperature defined based on a guaranteed operation temperature of the exhaust emission control catalyst 37, or performed based on a combination of the comparison results from the respective locations in the exhaust system.

Next, at S204 which follows if the fuel amount increase is requested at S203, the increasing amount controlling module 53 obtains an increase amount of the fuel in the fuel amount increase control (hereinafter, referred to as "the injection amount correction value"). The internal memory of the ECU 50 stores in advance an amount increase map in which the injection amount correction value based on the engine speed and the charge efficiency is defined. In the amount increase map, the injection amount correction value increases as the engine speed increases and the charge efficiency increases (i.e., the fuel amount is increased more). The increasing amount controlling module 53 obtains the injection amount correction value by comparing the engine speed and the charge efficiency with the amount increase map. The increasing amount controlling module 53 acquires a target value of the injection amount in the fuel amount increase control (hereinafter, referred to as "the amount-increase-controlled injection amount") by adding the injection amount correction value to the base value of the injection amount set by the base setting module 51.

Then at S205, the temperature estimating module 52 estimates the exhaust gas temperatures in the case where the fuel amount increase control is performed, before the fuel amount increase control is actually performed. Specifically, the temperature estimating module 52 obtains the first to fourth exhaust gas temperatures Ta to Td when the fuel amount increase control is performed. Hereinafter, the first to fourth exhaust gas temperatures Ta to Td for the case where the fuel amount increase control is performed are referred to as the first to fourth estimated exhaust gas temperatures Ta' to Td'. The temperature estimating module 52 calculates the first to fourth estimated exhaust gas temperatures Ta' to Td' by obtaining the discharging temperature T0, the first to fourth temperature increase amounts ΔTi1 to ΔTi4, and the first to fourth temperature decrease amounts ΔTe1 to ΔTe4 again, for the case where the fuel amount increase control is performed. Hereinafter, the discharging temperature T0, the first to fourth temperature increase amounts ΔTi1 to ΔTi4, and the first to fourth temperature decrease amounts ΔTe1 to ΔTe4 in the case where the fuel amount increase control is performed are referred to as the discharging temperature T0', the first to fourth temperature increase amounts ΔTi1' to ΔTi4', and the first to fourth temperature decrease amounts ΔTe1' to ΔTe4', respectively. In this embodiment, the discharging temperature T0' and the second to fourth temperature increase amounts ΔTi2' to ΔTi4' may be influenced by the fuel amount increase control as described below. The rest of the changing amounts of temperature remain the same as those calculated at S202.

The temperature estimating module 52 obtains the discharging temperature T0' by accounting for an influence of cooling of the exhaust gas by the fuel amount increase control. As described above, the temperature inside the cylinder 21 is decreased by the latent heat of the vaporization of the amount-increased fuel. By the increase of the fuel amount, since the air-fuel ratio shifts to the rich side, the discharging temperature T0' obtained by the temperature estimating module 52 based on the exhaust gas temperature map described above becomes lower than the discharging temperature T0 obtained at S202. The decrease amount of the discharging temperature T0' by the fuel amount increase control becomes larger as the injection amount correction value increases (i.e., the exhaust gas discharged from the cylinder 21 is cooled more as the fuel amount increases). The temperature estimating module 52 obtains the discharging temperature T0' in the above-described manner, by using an amount-increase-controlled air-fuel ratio.

Further, the temperature estimating module 52 obtains the second and fourth temperature increase amounts ΔTi2' and ΔTi4' by accounting for an influence of the fuel amount increase control on the afterburns. The amount-increased fuel is supplied to the exhaust system as the unburned fuel, which may cause the afterburns in the exhaust pipe and the exhaust emission control catalyst 37 as described above. Therefore, when the fuel amount increase control is performed, the afterburns easily occur according to the increased amount, and the second and fourth temperature increase amounts ΔTi2' and ΔTi4' may become higher than the second and fourth temperature increase amounts ΔTi2 and ΔTi4 obtained at S202, respectively. The temperature estimating module 52 obtains the second and fourth temperature increase amounts ΔTi2' and ΔTi4' in the above-described manner, by using the amount-increase-controlled air-fuel ratio.

Moreover, the temperature estimating module 52 obtains the third temperature increase amount ΔTi3' by accounting for the influence of the fuel amount increase control on the reaction heat of the exhaust emission control catalyst 37. When the air-fuel ratio is decreased by the fuel amount increase control, the purifying performance of the exhaust emission control catalyst 37 drops and the reaction heat decreases. As a result, the third temperature increase amount ΔTi3' becomes lower than the third temperature increase amount ΔTi3 obtained at S202. The temperature estimating module 52 obtains the third temperature increase amount ΔTi3' in the above-described manner, by using the amount-increase-controlled air-fuel ratio.

Furthermore, the temperature estimating module 52 calculates the first to fourth estimated exhaust gas temperatures Ta' to Td' based on the discharging temperature T0', the first to fourth temperature increase amounts ΔTi1' to ΔTi4', and the first to fourth temperature decrease amounts ΔTe1' to ΔTe4'. For example, the first estimated exhaust gas temperature Ta' is obtained by subtracting the first temperature decrease amount ΔTe1' from the discharging temperature T0', similar to the calculation of the first exhaust gas temperature Ta. The second estimated exhaust gas temperature Tb' is obtained by adding the first and second temperature increase amounts ΔTi1' and ΔTi2' to the first estimated exhaust gas temperature Ta' and subtracting the second temperature decrease amount ΔTe2 ' therefrom. The third estimated exhaust gas temperature Tc' is obtained by subtracting the third and fourth temperature decrease amounts ΔTe3' and ΔTe4' from the second estimated exhaust gas temperature Tb'. The fourth estimated exhaust gas temperature Td' is obtained by adding the third and fourth temperature increase amounts ΔTi3' and ΔTi4' to the third estimated exhaust gas temperature Tc'. In the calculations of the first to fourth estimated exhaust gas temperatures Ta' to Td', similar to the first to fourth estimated exhaust gas temperatures Ta to Td, a primary delay is suitably taken into consideration.

Next, in the case where the increasing amount controlling module 53 performs the fuel amount increase control, at S206, the valve controlling module 54 determines whether a protection for components of the exhaust system (in this embodiment, the exhaust ports 31, the turbine 4b, the O$_2$ sensor 67, and the exhaust emission control catalyst 37) is required, based on the temperature increase of the exhaust gas in the fuel amount increase control. Specifically, in this embodiment, before the fuel amount increase is actually started, the valve controlling module 54 determines whether the fourth estimated exhaust gas temperature Td' at the exhaust emission control catalyst 37 is above a given protection determination temperature corresponding to the exhaust emission control catalyst 37. In this embodiment, the protection determination temperature is defined based on the guaranteed operation temperature of the exhaust emission control catalyst 37 (i.e., in the case where the fuel amount increase control is performed, whether the temperature of the exhaust emission control catalyst 37 exceeds the guaranteed operation temperature is determined). Further, if the fourth estimated exhaust gas temperature Td' is determined to be above the protection determination temperature, the valve controlling module 54 determines that the protection for the components of the exhaust system is required (proceeds to S207). On the other hand, if the fourth estimated exhaust gas temperature Td' is determined to be the same as or below the protection determination temperature, the protection for the components of the exhaust system is determined to be not required and the increasing amount controlling module 53 starts increasing the injection amount (proceeds to S209). Note that in this embodiment, when the fourth estimated exhaust gas temperature Td' at the exhaust emission control catalyst 37 is below the protection determination temperature, the first estimated exhaust gas temperature Ta' at the exhaust port 31, the second estimated exhaust gas temperature Tb' at the turbine 4b, and the third estimated exhaust gas temperature Tc' at the O$_2$ sensor 67 do not exceed the guaranteed operation temperatures of the corresponding components of the exhaust system. Alternatively, whether the protection for the components of the exhaust system is required may be determined based on one of the first estimated exhaust gas temperature Ta' at the exhaust port 31, the second estimated exhaust gas temperature Tb' at the turbine 4b, and the third estimated exhaust gas temperature Tc' at the O$_2$ sensor 67, or based on a combination of at least two of the first to fourth estimated exhaust gas temperatures Ta' to Td', instead of being based on the fourth estimated exhaust gas temperature Td' at the exhaust emission control catalyst 37.

Subsequently at S207, the valve controlling module 54 obtains a shortening amount of the overlapping period (hereinafter, referred to as "the overlap reduction amount"). By shortening the overlapping period, the components of the exhaust system can be protected. The overlap reduction amount is obtained based on the estimated exhaust gas temperatures Ta' to Td' for the case where the fuel amount increase control is performed. In this embodiment, the overlap reduction amount is obtained based on the fourth estimated exhaust gas temperature Td' at the exhaust emission control catalyst 37 which is used for the determination described above. Specifically, as described above, the fourth estimated exhaust gas temperature Td' is obtained based on the discharging temperature T0', the first to fourth temperature increase amounts ΔTi1' to ΔTi4', and the first to fourth temperature decrease amounts ≠Te1' to ΔTe4'which are obtained by accounting for the influence of the fuel amount increase control. Among these temperature and temperature amounts, the first temperature decrease amount ΔTe1' and the second and fourth temperature increase amounts ΔTi2' and ΔTi4' may be influenced by the blow-through flow rate of the fresh air. A blow-through flow rate required for decreasing the fourth estimated exhaust gas temperature Td' down to a fourth guaranteed operation temperature Tt4 or below is obtained by inverse calculations of the first temperature decrease amount ΔTe1' and the second and fourth temperature increase amounts ΔTi2' and ΔTi4'. Since the blow-through flow rate is obtained by multiplying the blow-through rate corresponding to the overlapping amount by the intake air flow rate as described above, by the inverse calculations thereof, the overlapping amount corresponding to the blow-through flow rate (i.e., the overlap reduction amount) required for decreasing the fourth estimated exhaust gas temperature Td' down to the fourth guaranteed operation temperature Tt4 or below is obtained. In this manner, the valve controlling module 54 obtains the blow-through flow rate required for decreasing the fourth estimated exhaust gas temperature Td' down to the fourth guaranteed operation temperature Tt4 or below, and acquires the overlap reduction amount corresponding to the blow-through flow rate. Further, the overlap reduction amount increases as the fourth estimated exhaust gas temperature Td' increases above the fourth guaranteed operation temperature Tt4. Note that the overlap reduction amount may be obtained based on one of the first to third estimated exhaust gas temperatures Ta' to Tc', or based on a combination of at least two of the first to fourth estimated exhaust gas temperatures Ta' to Td', without limiting to the fourth estimated exhaust gas temperature Td'.

At S208, the valve controlling module 54 activates the exhaust VVT 26 to advance the close timing of the exhaust valve 29 by the overlap reduction amount obtained at S207. In this manner, the overlapping period in which the intake and exhaust valves 22 and 29 are both opened on the intake stroke is shortened. The valve controlling module 54 shortens the overlapping period and then the increasing amount controlling module 53 starts the fuel amount increase.

Next at S209, the increasing amount controlling module 53 performs the fuel amount increase control (starts increasing the fuel amount). Specifically, the increasing amount controlling module 53 increases the injection amount set by the base setting module 51, to the amount-increase-controlled injection amount acquired at S204 described above.

By performing the fuel amount increase control, the discharging temperature T0 decreases according to the latent heat of the vaporization, and the exhaust gas temperatures at the respective locations in the exhaust system, for example, the first exhaust gas temperature Ta at the exhaust port 31, is decreased. On the other hand, by performing the fuel amount increase control, the temperatures at the respective components of the exhaust system may exceed the guaranteed operation temperatures thereof due to the temperature increase of the exhaust gas caused by the afterburns. As described at S206 to S209 above, if there is a possibility of such a problem occurring, the components of the exhaust system are protected by shortening the overlapping period. Specifically, by shortening the overlapping period, the blow-through flow rate of the fresh air decreases. When the blow-through flow rate decreases, although the first temperature decrease amount ΔTe1 decreases and the temperature of the exhaust port 31 increases, the temperature increase of the exhaust gas caused by the afterburns is suppressed; in other words, the second and fourth temperature increase amounts ΔTi2 and ΔTi4 are reduced by a reduced amount of oxygen supplied to the exhaust system. In the case where the overlapping amount is reduced, a total of the decrease amounts of the exhaust gas temperature caused by the suppression of the afterburns is larger than the increase amount of the exhaust gas temperature caused by the temperature increase of the exhaust port 31. Therefore, by reducing the overlapping amount, the temperature increase of the exhaust gas is suppressed, which results in protecting the components of the exhaust system.

As described above, the ECU 50 includes the valve controlling module 54 for performing, via the intake and exhaust VVTs 25 and 26, the valve overlap in which the intake and exhaust valves 22 and 29 are both opened on the intake stroke of the engine 100, and the temperature estimating module 52 for estimating the temperature of the exhaust gas. The temperature estimating module 52 estimates the temperature increase caused by the afterburn that occurs due to the fresh air blowing through to the exhaust system during the valve overlap, and estimates the exhaust gas temperature by accounting for the temperature increase of the exhaust gas caused by the afterburn.

According to this configuration, the valve overlap is performed on the intake stroke, and the fresh air blow-through occurs. Here, the afterburn occurs if the unburned fuel exists in the exhaust system. Therefore, the temperature estimating module 52 estimates the temperature increase caused by the afterburn, and estimates the exhaust gas temperature by accounting for the temperature increase of the exhaust gas caused by the afterburn. As a result, the temperature estimating module 52 accurately estimates the exhaust gas temperature.

The temperature estimating module 52 estimates the discharging temperature T0 based on the operating state of the engine 100 and estimates the exhaust gas temperature based on the discharging temperature T0, the discharging temperature being a temperature of the exhaust gas when discharged from the cylinder 21 to the exhaust system.

According to this configuration, the exhaust gas temperature is accurately estimated by accounting for the variation of the exhaust gas temperature according to the operating state of the engine 100. For example, depending on the operating state of the engine, the injection amount from the fuel injector 23 may be increased to lower the exhaust gas temperature with the latent heat of the vaporization of the fuel. Even in such a case, the discharging temperature T0 in consideration of the increased fuel amount is estimated. Thus, the temperature estimating module 52 accurately estimates the exhaust gas temperature by accounting for the temperature decrease amount caused by the fuel amount increase and the temperature increase amount of the exhaust gas caused by the afterburn.

Further, the temperature estimating module 52 estimates the temperature decrease of the exhaust gas caused by the exhaust port 31 being cooled due to the fresh air blowing through to the exhaust system during the valve overlap (i.e., first temperature decrease amount ΔTe1), and estimates the exhaust gas temperature by further accounting for the temperature decrease caused by the cooling of the exhaust port 31.

According to this configuration, as the influence of the fresh air blow-through, the cooling of the exhaust port 31 is also accounted for in addition to the afterburn. In other words, the fresh air blow-through does not only increase the exhaust gas temperature by the afterburn, but also decreases the exhaust gas temperature by the cooling of the exhaust port 31. Therefore, the temperature estimating module 52 estimates the first temperature decrease amount ΔTe1, and estimates the exhaust gas temperature by further accounting for the first temperature decrease amount ΔTe1. Thus, the temperature estimating module 52 further accurately estimates the exhaust gas temperature.

Further, the exhaust system includes the exhaust emission control catalyst 37, and the temperature estimating module 52 estimates, as the temperature increase of the exhaust gas caused by the afterburn, the temperature increase caused by the afterburn that occurs in the exhaust system upstream of the exhaust emission control catalyst 37 (i.e., second temperature increase amount $\Delta$Ti2), and the temperature increase caused by the afterburn that occurs at the exhaust emission control catalyst 37 (i.e., fourth temperature increase amount $\Delta$Ti4).

According to this configuration, in estimating the exhaust gas temperature, both the afterburn that occurs in the exhaust system upstream of the exhaust emission control catalyst 37 and the afterburn that occurs at the exhaust emission control catalyst 37 are taken into consideration. Thus, the exhaust gas temperature is further accurately estimated.

Further, an upstream part of the exhaust system is structured by the branched pipes 30a communicating with the plurality of cylinders 21. The branched pipes 30a are collected together in the manifold section 30b. The temperature estimating module 52 estimates, as the temperature increase caused by the afterburn that occurs in the exhaust system upstream of the exhaust emission control catalyst 37, the temperature increase caused by the afterburn that occurs at the manifold section 30b (i.e., second temperature increase amount $\Delta$Ti2).

According to this configuration, the branched pipes 30a communicating with the plurality of cylinders 21 are collected together in the manifold section 30b. Therefore, the exhaust gas discharged from the cylinders 21 merge in the manifold section 30b and the temperature thereof easily becomes high. In other words, the afterburn easily occurs at the manifold section 30b. For this reason, the temperature estimating module 52 estimates the exhaust gas temperature by accounting for the plurality of afterburns that highly possibly occur in the exhaust system. Thus, the exhaust gas temperature is estimated more accurately.

Further, the temperature estimating module 52 estimates the temperature increase of the exhaust gas caused by the exhaust gas merging in the manifold section 30b after being discharged from the plurality of cylinders 21 (i.e., first temperature increase amount $\Delta$Ti1), and estimates the exhaust gas temperature by further accounting for the first temperature increase amount $\Delta$Ti1.

As described above, the temperature of the manifold section 30b easily becomes high due to the merging of the exhaust gas discharged from the plurality of cylinders 21. Therefore, the exhaust gas discharged from the plurality of cylinders 21 after the temperature of the manifold section 30b is increased receives heat from the manifold section 30b, and the temperature of the exhaust gas increases. For this reason, the temperature estimating module 52 estimates the exhaust gas temperature by accounting for the heat reception from the manifold section 30b. Thus, the exhaust gas temperature is estimated more accurately.

Further, the temperature estimating module 52 estimates the temperature increase of the exhaust gas caused by the reaction heat at the exhaust emission control catalyst 37 (i.e., third temperature increase amount $\Delta$Ti3), and estimates the exhaust gas temperature by further accounting for the third temperature increase amount $\Delta$Ti3.

As described above, the exhaust emission control catalyst 37 is not only where the afterburn occurs, but may also be increased in temperature by the reaction heat therein. For this reason, the temperature estimating module 52 estimates the exhaust gas temperature by accounting for the reaction heat at the exhaust emission control catalyst 37. Thus, the exhaust gas temperature is estimated more accurately.

Further, the temperature estimating module 52 estimates the temperature decrease of the exhaust gas caused by the cooling of the exhaust system with the traveling wind (i.e., second or third temperature decrease amount $\Delta$Te2 or $\Delta$Te3), and estimates the exhaust gas temperature by further accounting for the second or third temperature decrease amount $\Delta$Te2 or $\Delta$Te3.

According to this configuration, the temperature estimating module 52 estimates the temperature decrease of the exhaust gas caused by the cooling of the exhaust system with the traveling wind. Thus, the exhaust gas temperature is estimated more accurately.

Further, the exhaust system includes the turbine 4b of the turbocharger 4. The temperature estimating module 52 estimates the temperature decrease of the exhaust gas caused by the work of the turbine 4b (i.e., fourth temperature decrease amount $\Delta$Te4), and estimates the exhaust gas temperature by further accounting for the fourth temperature decrease amount $\Delta$Te4.

According to this configuration, the temperature estimating module 52 estimates the exhaust gas temperature by further accounting for the temperature decrease of the exhaust gas caused by the work of the turbine. Thus, the exhaust gas temperature is estimated more accurately.

(Other Embodiments)

As above, the embodiment is described as an illustrative example of the art disclosed in the present application. However, the art of this disclosure is not limited to this, and also applicable to embodiments with suitable modification(s), change(s), replacement(s), addition(s), omission(s), etc. Further, some of the components described in the embodiment may be combined to constitute a new embodiment. Moreover, the components illustrated in the appended drawings and described in the detailed description of the embodiments may include not only essential components for solving the above issues which occur with the conventional arts, but also non-essential components for solving the above problems, in order to illustratively describe the art. Therefore, the non-essential components should not be considered essential simply because they are illustrated in the appended drawings or described in the detailed description of the embodiments.

The above embodiment may have any of the following configurations.

The configuration of the engine 100 described above is an example and is not limited to this.

Further, the temperature estimating module 52 described above estimates the exhaust gas temperatures at the exit of the exhaust port 31, the position immediately upstream of the turbine 4b, the $O_2$ sensor 67, and the exhaust emission control catalyst 37; however, it is not limited to this. By accounting for the gain and loss of heat on the upstream side of a location where the exhaust gas temperature is to be estimated, the temperature estimating module 52 may estimate the exhaust gas temperature at any location in the exhaust system.

Further, for the gain and loss of heat, the temperature estimating module 52 described above takes into consideration the first to fourth temperature increase amounts $\Delta$Ti1 to $\Delta$Ti4 and the first to fourth temperature decrease amounts $\Delta$Te1 to $\Delta$Te4; however, it is not limited to this. Depending on the engine, there may exist a factor which has a small influence on the exhaust gas temperature. In such a case, unnecessary one(s) of the first to fourth temperature increase amounts $\Delta$Ti1 to $\Delta$Ti4 and the first to fourth temperature decrease amounts $\Delta$Te1 to $\Delta$Te4 may be omitted. Alternatively, depending on the engine, there may exist a different factor which has a large influence on the exhaust gas temperature. In such a case, the exhaust gas temperature may be estimated by further accounting for the different factor.

Further, for the influence of the afterburns, the temperature estimating module 52 described above takes into consideration (iii) the heat reception caused by the afterburn at the position of the exhaust pipe upstream of the turbine 4b and (viii) the heat reception caused by the afterburn at the exhaust emission control catalyst 37; however, it is not limited to this. The temperature estimating module 52 may take into consideration only one of the afterburns or afterburn(s) at other location(s).

Further, the various maps used by the temperature estimating module 52 are merely an example, and characteristics of the various maps vary depending on the engine.

Further, the valve controlling module 54 determines that the protection for the components of the exhaust system is required, when the fourth estimated exhaust gas temperature Td' at the exhaust emission control catalyst 37 is above the protection determination temperature corresponding to the exhaust emission control catalyst 37; however, it is not limited to this. The valve controlling module 54 may determine that the protection for the components of the exhaust system is required, when the temperature of the exhaust emission control catalyst 37 is above a given determination component temperature. The determination component temperature is defined based on the guaranteed operation temperature of the exhaust emission control catalyst 37. Similarly, the determination may be performed based on the temperature of the exhaust port 31, the temperature of the turbine 4b, the temperature of the 02 sensor 67, or a combination of at least two of the temperatures of the exhaust port 31, the turbine 4b, the $O_2$ sensor 67, and the exhaust emission control catalyst 37. Moreover, the shortening amount of the overlapping period may be set based on the temperatures of the respective components of the exhaust system.

Further, the valve controlling module 54 shortens the overlapping period by advancing the close timing of the exhaust valve 29; however, it is not limited to this. The valve controlling module 54 may shorten the overlapping period by retarding the open timing of the intake valve 22, or by advancing the close timing of the exhaust valve 29 and also retarding the open timing of the intake valve 22.

Further, by shortening the overlapping period, the valve controlling module 54 protects the exhaust port 31, the turbine 4b, the $O_2$ sensor 67, and the exhaust emission control catalyst 37 as the components of the exhaust system; however, it is not limited to this. The valve controlling module 54 may protect any component of the exhaust system by performing the determination based on the temperature increase of the exhaust gas.

As described above, the art disclosed here is useful for the control apparatus of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

100 Engine
20 Engine Body
21 Cylinder
22 Intake Valve
25 Intake VVT
26 Exhaust VVT
29 Exhaust Valve
30 Exhaust Passage
30a Branched Pipe
30b Manifold Section
31 Exhaust Port
37 Exhaust Emission Control Catalyst (Catalyst)
4 Turbocharger
4b Turbine
50 ECU (Control Apparatus)
52 Temperature Estimating Module
53 Increasing Amount Controlling Module
54 Valve Controlling Module

What is claimed is:

1. A control apparatus of an engine including an intake valve, an exhaust valve, a variable valve timing mechanism for varying open and close timings of at least one of the intake and exhaust valves, an exhaust manifold, a turbocharger that is disposed at a downstream side of the exhaust manifold and having a turbine and turbine-bypass passage, a waste-gate valve that is disposed on the turbine-bypass passage, and a catalyst that is disposed at a downstream side of the turbocharger, the control apparatus comprising a processor configured to execute:

a temperature estimator for estimating a temperature of exhaust gas at a given location in an exhaust system by estimating a first temperature increase of the exhaust gas caused by afterburn occurring at the exhaust manifold and the catalyst due to fresh air blowing through a cylinder of the engine to the exhaust system during a valve overlap, estimating a first temperature decrease based on an opening of the waste-gate valve and a turbine flow rate, adding the first temperature increase to a discharging temperature and subtracting the first temperature decrease from the discharging temperature to calculate the estimated temperature of the exhaust gas, and further decreasing the estimated temperature of the exhaust gas as an air-fuel ratio shifts to be richer from a stoichiometric ratio, wherein the first temperature decrease is estimated via a map defining a base value of the first temperature decrease based on the opening of the waste-gate valve; and a valve controller for performing, via the variable valve timing mechanism, the valve overlap in which the intake and exhaust valves are both opened on intake stroke of the engine, wherein the valve controller controls the valve overlap to shorten an amount of an overlapping period when the processor determines that the estimated temperature of the exhaust gas exceeds a predetermined temperature threshold.

2. The control apparatus of claim 1, wherein the temperature estimator estimates the discharging temperature based on an operating state of the engine and estimates the exhaust gas temperature at the given location in the exhaust system based on the discharging temperature, the discharging temperature being a temperature of the exhaust gas when discharged from the cylinder to the exhaust system.

3. The control apparatus of claim 2, wherein the temperature estimator estimates a temperature decrease of the exhaust gas caused by an exhaust port being cooled due to the fresh air blowing through to the exhaust system during the valve overlap, and estimates the exhaust gas temperature at the given location in the exhaust system by further accounting for the temperature decrease caused by the cooling of the exhaust port.

4. The control apparatus of claim 1,
wherein the temperature estimator estimates, as the first temperature increase of the exhaust gas caused by the afterburn, a temperature increase caused by afterburn that occurs in the exhaust system upstream of the catalyst, and a temperature increase caused by afterburn that occurs at the catalyst.

5. The control apparatus of claim 4, wherein the temperature estimator estimates a temperature increase of the exhaust gas caused by the exhaust gas merging in a manifold section after being discharged from a plurality of cylinders, and estimates the exhaust gas temperature at the given location in the exhaust system by further accounting for the temperature increase caused by merging of the exhaust gas in the manifold section.

6. The control apparatus of claim 4, wherein the temperature estimator estimates a temperature increase of the exhaust gas caused by a reaction heat at the catalyst, and estimates the exhaust gas temperature at the given location in the exhaust system by further accounting for the temperature increase caused by the reaction heat of the catalyst.

7. The control apparatus of claim 1, wherein the temperature estimator estimates a temperature decrease of the exhaust gas caused by the exhaust system being cooled with a traveling wind, and estimates the exhaust gas temperature at the given location in the exhaust system by further accounting for the temperature decrease caused by the cooling with the traveling wind.

8. A control apparatus of an engine including an intake valve, an exhaust valve, a variable valve timing mechanism for varying open and close timings of at least one of the intake and exhaust valves, the control apparatus comprising a processor configured to execute:

a temperature estimator for estimating a temperature of exhaust gas at a given location in an exhaust system by estimating a first temperature increase caused by afterburn occurring due to fresh air blowing through a cylinder of the engine to the exhaust system during a valve overlap, estimating a first temperature decrease based on a turbine flow rate, adding the first temperature increase to a discharging temperature and subtracting the first temperature decrease from the discharging temperature to calculate the estimated temperature of the exhaust gas, and further decreasing the estimated exhaust gas temperature as an air-fuel ratio shifts to be richer from a stoichiometric ratio; and a valve controller for performing, via the variable valve timing mechanism, the valve overlap in which the intake and exhaust valves are both opened on intake stroke of the engine, wherein
the valve controller controls the valve overlap to shorten an amount of an overlapping period when the processor determines that the estimated temperature of the exhaust gas exceeds a predetermined temperature threshold.

9. The control apparatus of claim 8, wherein
the valve controller shortens the amount of the overlapping period by advancing a closing timing of the exhaust valve.

10. The control apparatus of claim 1, wherein the temperature estimator further increases the estimated temperature of the exhaust gas as a fresh air blow-through flow rate increases.

11. The control apparatus of claim 8, wherein the temperature estimator further increases the estimated temperature of the exhaust gas as a fresh air blow-through flow rate increases.

* * * * *